US012718062B2

(12) United States Patent
Hong et al.

(10) Patent No.: US 12,718,062 B2
(45) Date of Patent: Aug. 25, 2026

(54) NEURAL NETWORK PROCESSING METHOD, DEVICE AND SYSTEM

(71) Applicant: SOPHGO TECHNOLOGIES LTD., Beijing (CN)

(72) Inventors: Zonghui Hong, Beijing (CN); Yuanhong Huo, Beijing (CN); Guangchong Shen, Beijing (CN); Guangfei Zhang, Beijing (CN)

(73) Assignee: SOPHGO TECHNOLOGIES LTD., Beijing (CN)

( * ) Notice: Subject to any disclaimer, the term of this patent is extended or adjusted under 35 U.S.C. 154(b) by 1071 days.

(21) Appl. No.: 17/854,221

(22) Filed: Jun. 30, 2022

(65) Prior Publication Data

US 2022/0326912 A1 Oct. 13, 2022

Related U.S. Application Data

(63) Continuation of application No. PCT/CN2020/072475, filed on Jan. 16, 2020.

(51) Int. Cl.
*G06N 3/045* (2023.01)
*G06F 7/544* (2006.01)
(Continued)

(52) U.S. Cl.
CPC ........... *G06N 3/045* (2023.01); *G06F 17/153* (2013.01); *G06N 3/0464* (2023.01); *G06F 7/5443* (2013.01); *G06F 9/5072* (2013.01)

(58) Field of Classification Search
CPC .... G06N 3/045; G06N 3/0464; G06F 17/153; G06F 7/5443; G06F 9/5072; G06F 3/06; G06F 3/0601–0613
See application file for complete search history.

(56) References Cited

U.S. PATENT DOCUMENTS 10,902,315 B2 * 1/2021 Fang ..................... G06F 7/5443
11,210,586 B1 * 12/2021 Duong ................. G06N 3/0464
(Continued)

FOREIGN PATENT DOCUMENTS

CN 107341545 A 11/2017
CN 107578098 A 1/2018
(Continued)

OTHER PUBLICATIONS

A. Rahman, J. Lee and K. Choi, "Efficient FPGA acceleration of Convolutional Neural Networks using logical-3D compute array," 2016 Design, Automation & Test in Europe Conference & Exhibition, Dresden, Germany, 2016, pp. 1393-1398. (Year: 2016).*
(Continued)

*Primary Examiner* — Andrew Caldwell
*Assistant Examiner* — Kenny K. Bui
(74) *Attorney, Agent, or Firm* — Scully, Scott, Murphy & Presser, P.C.

(57) ABSTRACT

A neural network processing method, device and system are provided, and the device includes: a first computing array configured to execute a first type of neural network operation; a second computing array configured to execute a second type of neural network operation, the second type of neural network operation being different from the first type of neural network operation; and a control module configured to control the first computing array to execute the first type of neural network operation, and control the second computing array to execute the second type of neural network operation. By including a plurality of computing arrays configured to execute different types of operations in a neural network, acceleration of multiple types of operations in the neural network could be achieved, and computational efficiency of a deep neural network could be improved.

10 Claims, 8 Drawing Sheets

(51) Int. Cl.

| | |
|---|---|
| ***G06F 9/50*** | (2006.01) |
| ***G06F 17/15*** | (2006.01) |
| ***G06N 3/0464*** | (2023.01) |

(56) References Cited

U.S. PATENT DOCUMENTS

| | | | |
|---|---|---|---|
| 2017/0323196 | A1 | 11/2017 | Gibson et al. |
| 2017/0323197 | A1 | 11/2017 | Gibson et al. |
| 2018/0157962 | A1 | 6/2018 | Henry et al. |
| 2018/0307980 | A1 | 10/2018 | Barik et al. |
| 2019/0243651 | A1 | 8/2019 | Venkataramani et al. |
| 2019/0303743 | A1 | 10/2019 | Venkataramani et al. |
| 2019/0340491 | A1* | 11/2019 | Norden .................. G06N 3/063 |
| 2021/0241082 | A1 | 8/2021 | Nagy et al. |
| 2021/0382719 | A1 | 12/2021 | Venkataramani et al. |
| 2022/0027717 | A1 | 1/2022 | Gibson et al. |
| 2022/0050683 | A1 | 2/2022 | Venkataramani et al. |

FOREIGN PATENT DOCUMENTS

| | | | |
|---|---|---|---|
| CN | 107918794 | A | 4/2018 |
| CN | 108268941 | A | 7/2018 |
| CN | 108665059 | A | 10/2018 |
| CN | 108764466 | A | 11/2018 |
| CN | 108805266 | A | 11/2018 |
| CN | 109284817 | A | 1/2019 |
| CN | 109635937 | A | 4/2019 |
| CN | 109978143 | A | 7/2019 |
| CN | 110033086 | A | 7/2019 |
| CN | 110210610 | A | 9/2019 |
| CN | 210924662 | U | 7/2020 |
| EP | 3557485 | A1 | 10/2019 |
| WO | 2018034682 | A1 | 2/2018 |

OTHER PUBLICATIONS

Patterson, D. A., & Hennessy, J. L. (2013). Computer Organization and Design MIPS Edition: The Hardware/Software Interface (5th ed.). Morgan Kaufmann. Sec.5.1-5.4 (Year: 2013).*

Patterson, D. A., & Hennessy, J. L. (2017). Computer Organization and Design RISC-V Edition: The Hardware Software Interface. Morgan Kaufmann. Sec.1.1-1.2, and Appendex.B.5 (Year: 2017).*

First Office Action dated Mar. 13, 2025 received in Chinese Patent Application No. 202080089427.7.

Zhou Z.G., "Research on Convolutional Neuron Networks Accelerator Based on FPGA", (M.S. thesis). Harbin University of Science and Technology (2019).

Chinese Notification to Grant Patent Right for Invention dated Dec. 25, 2025 received in Chinese Application No. 202080089427.7.

* cited by examiner

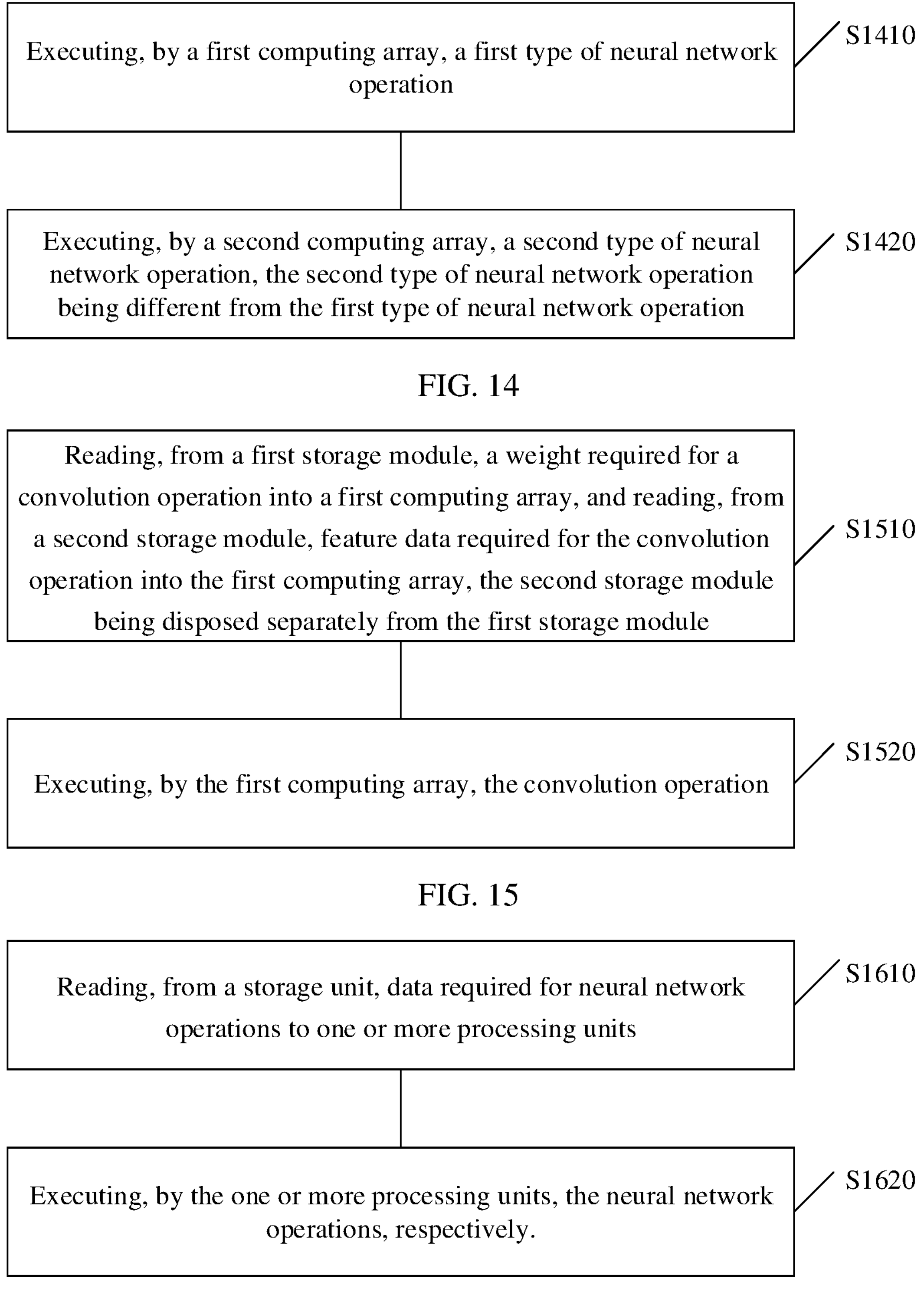
Executing, by a first computing array, a first type of neural network operation
S1410
Executing, by a second computing array, a second type of neural network operation, the second type of neural network operation being different from the first type of neural network operation
S1420
FIG. 14
Reading, from a first storage module, a weight required for a convolution operation into a first computing array, and reading, from a second storage module, feature data required for the convolution operation into the first computing array, the second storage module being disposed separately from the first storage module
S1510
Executing, by the first computing array, the convolution operation
S1520
FIG. 15
Reading, from a storage unit, data required for neural network operations to one or more processing units
S1610
Executing, by the one or more processing units, the neural network operations, respectively.
S1620
FIG. 16

NEURAL NETWORK PROCESSING METHOD, DEVICE AND SYSTEM

CROSS-REFERENCE TO RELATED APPLICATIONS

This application is a continuation of International Application No. PCT/CN2020/072475, filed on Jan. 16, 2020, the disclosure of which is hereby incorporated by reference in its entirety.

TECHNICAL FIELD

The present application relates to the field of data processing, and in particular, to a neural network processing method, device and system.

BACKGROUND

Deep neural network learning has good application prospects in the fields of image processing, pattern recognition, speech recognition, natural languages, and the like. The deep neural network learning needs to process a large amount of data. With the development of the deep neural network learning, requirements for processors are becoming higher and higher, conventional processors have been difficult to meet computational demands for deep learning, and an accelerator chip specific to a neural network is proposed.

In the current technology, a tensor processing unit (TPU) is a neural network specific processor that can accelerate computation of a neural network, and mainly the TPU adopts a matrix computing unit based on a systolic array. The systolic array can play a good role in acceleration of a convolution operation.

In addition to the convolution operation, the deep neural network learning includes multiple other types of operations, such as a pooling operation or a fully connected operation, and it is necessary to achieve computational acceleration of multiple types of operations in the neural network.

SUMMARY

Embodiments of the present disclosure provide a neural network processing method, device and system, which could achieve computational acceleration of multiple types of operations in a neural network.

In a first aspect, a device for neural network processing is provided, and the device includes: a first computing array configured to execute a first type of neural network operation; a second computing array configured to execute a second type of neural network operation, the second type of neural network operation being different from the first type of neural network operation; and a control module configured to control the first computing array to execute the first type of neural network operation, and control the second computing array to execute the second type of neural network operation.

It should be understood that, according to a device for neural network processing provided in an embodiment of the present disclosure, by including a plurality of computing arrays configured to execute different types of operations in a neural network, acceleration of multiple types of operations in the neural network could be achieved, and thus computational efficiency of a deep neural network could be improved.

In some implementation manners, the control module is configured to control the first computing array and the second computing array, so that the first type of neural network operation and the second type of neural network operation are executed in parallel.

It should be understood that, according to the device for neural network processing provided in an embodiment of the present disclosure, by executing multiple types of operations in the neural network in parallel, the computational efficiency of the deep neural network could be effectively improved.

In some implementation manners, the first type of neural network operation is a convolution operation, and the first computing array is a 3D MAC array.

In some implementation manners, the first type of neural network operation is a convolution operation, and the first computing array is a systolic array.

In some implementation manners, the second type of neural network operation includes a vectorial operation.

The vectorial operation represents an operation of multi-dimensional data and multi-dimensional data.

The vectorial operation in an embodiment of the present disclosure includes, but is not limited to, a pooling operation, a fully connected operation, and the like.

In some implementation manners, the device further includes: a first storage module configured to store a weight required for the convolution operation; and a second storage module disposed separately from the first storage module, and configured to store feature data required for the convolution operation; where the control module is configured to: read the weight required for the convolution operation from the first storage module to the first computing array, and read the feature data required for the convolution operation from the second storage module to the first computing array.

Optionally, the control module is configured to read the weight and the feature data required for the convolution operation in parallel from the first storage module and the second storage module to the first computing array.

It should be understood that, according to the device for neural network processing provided in an embodiment of the present disclosure, by using two storage modules to separately store feature data and a weight required for the convolution operation, the feature data and the weight required for the convolution operation can be read from two read ports, respectively, which could improve data reading efficiency during convolutional neural network processing, thereby improving the overall efficiency of the convolutional neural network processing.

In some implementation manners, the control module includes: a first control unit configured to read the weight required for the convolution operation from the first storage module to the first computing array; and a second control unit configured to read the feature data required for the convolution operation from the second storage module to the first computing array.

In some implementation manners, the device further includes: a cache configured to cache the feature data required for the convolution operation that is read from the second storage module; where the control module is configured to read the feature data required for the convolution operation from the cache to the first computing array.

In some implementation manners, the control module is configured to: determine whether the cache has the feature data required for the convolution operation executed by the first computing array; and if a determination result is yes, read the feature data required for the convolution operation from the cache to the first computing array; or if a determination result is no, read required feature data from the second storage module into the cache, and read the feature data required for the convolution operation from the cache to the first computing array.

In some implementation manners, a distance between the cache and the first computing array is less than a distance between the second storage module and the first computing array.

It should be understood that, according to the device for neural network processing provided in an embodiment of the present disclosure, by using a cache to cache the feature data required for the convolution operation, reading efficiency of the feature data required for the convolution operation could be improved, and power consumption of data reading could be reduced.

In some implementation manners, the second storage module is further configured to store data required for the second type of neural network operation; where the control module is further configured to read the data required for the second type of neural network operation from the second storage module to the second computing array.

It should be understood that the first computing array and the second computing array share one storage module: the second storage module, which could reduce the space occupied by the storage module.

In some implementation manners, the device further includes: a third storage module configured to store data required for the first type of neural network operation; and a fourth storage module disposed separately from the third storage module, and configured to store data required for the second type of neural network operation; where the control module is configured to: control the first computing array to read the data required for the first type of neural network operation from the third storage module; and control the second computing array to read the data required for the second type of neural network operation from the fourth storage module.

It should be understood that, according to the device for neural network processing provided in an embodiment of the present disclosure, by using two storage modules to separately store data required for the first neural network operation and data required for the second neural network operation, the data required for the first neural network operation and the data required for the second neural network operation can be read from two read ports to the first computing array and the second computing array, respectively, which could improve efficiency of data reading, thereby improving computational efficiency of the neural network.

In some implementation manners, a distance between the third storage module and the first computing array is less than a distance between the fourth storage module and the first computing array; and/or a distance between the fourth storage module and the second computing array is less than a distance between the third storage module and the second computing array.

In some implementation manners, the device includes a plurality of second computing arrays. Each second computing array may support multiple types of operations.

In some implementation manners, the device includes a plurality of second computing arrays, and the plurality of second computing arrays are configured to execute a same type of operations in the neural network. For example, the plurality of second computing arrays are configured to execute pooling operations.

It should be understood that, according to the device provided in an embodiment of the present disclosure, a same type of operations can be executed by a plurality of second computing arrays, which could effectively improve the computational efficiency.

In some implementation manners, the device is a tensor processing unit (TPU).

In a second aspect, a device for neural network processing is provided, and the device includes: a first computing array configured to execute a first type of neural network operation, the first computing array being a 3D MAC array, and the first type of neural network operation being a convolution operation; a first storage module configured to store a weight required for the convolution operation; a second storage module disposed separately from the first storage module, and configured to store feature data required for the convolution operation; and a control module configured to read the weight required for the convolution operation from the first storage module to the first computing array, and read the feature data required for the convolution operation from the second storage module to the first computing array.

Optionally, the second storage module is further configured to store a computation result of the first computing array.

It should be understood that, according to a device for neural network processing provided in an embodiment of the present disclosure, by storing feature data and a weight required for a convolution operation separately, the feature data and the weight required for the convolution operation can be read from two read ports, respectively, which could improve efficiency of data reading.

In some implementation manners, the control module is configured to read the weight and the feature data required for the convolution operation in parallel from the first storage module and the second storage module to the first computing array.

In some implementation manners, the device further includes: a cache configured to cache the feature data required for the convolution operation that is read from the second storage module; where the control module is configured to read the feature data required for the convolution operation from the cache to the first computing array.

In some implementation manners, the control module is configured to: determine whether the cache has the feature data required for the convolution operation executed by the first computing array; and if a determination result is yes, read the feature data required for the convolution operation from the cache to the first computing array; or if a determination result is no, read required feature data from the second storage module into the cache, and read the feature data required for the convolution operation from the cache to the first computing array.

In some implementation manners, a distance between the cache and the first computing array is less than a distance between the second storage module and the first computing array.

In a third aspect, a system for neural network processing is provided, and the system includes the following units.

One or more processing units are included, a processing unit is the device for neural network processing provided in the first aspect or the second aspect. In a case that the system includes more processing units, the more processing units include the device for neural network processing provided in the first aspect and/or the second aspect.

A storage unit is configured to store data required for neural network operations executed by the one or more processing units.

A data portage unit is configured to read out the data required for the neural network operations that is stored in the storage unit into the one or more processing units.

It should be understood that a system provided in an embodiment of the present disclosure can support a plurality of neural networks, and has good generality. In addition, the system can execute operations of the plurality of neural networks in parallel, which can improve computational efficiency of the neural networks.

In some implementation manners, the system includes the more processing units; where the more processing units are configured to execute the neural network operations in parallel.

In some implementation manners, the data portage unit includes: one or more intermediate units in one-to-one correspondence to the one or more processing units, where each intermediate unit is configured to be responsible for data transport between a corresponding processing unit and the storage unit.

The transport here includes: reading out data from the storage unit to a processing unit, or writing a processing result of a processing unit into the storage unit.

In some implementation manners, the system includes the more processing units; where the data portage unit further includes: a broadcasting unit configured to broadcast data shared by the more processing units that is stored in the storage unit to the more processing units in a case that the more processing units are configured to execute operations of a same neural network.

In some implementation manners, the storage unit includes one or more of a first storage and a second storage, and a read speed of the second storage is greater than a read speed of the first storage.

In some implementation manners, the first storage is a memory, and the second storage is a secondary storage L2.

In some implementation manners, the system includes the more processing units, where different processing units of the more processing units are configured to execute operations of different neural networks.

In some implementation manners, the system further includes an interconnection structure configured for data or command transmission between the one or more processing units and the storage unit.

The more processing units included in the system provided in an embodiment of the present disclosure may run different neural networks, or may run the same neural networks simultaneously. Such flexible configuration can improve not only a utilization ratio of each processing unit, but also the overall computational capability of the system.

Hereinafter, a fourth aspect provides a method for neural network processing corresponding to the device for neural network processing provided in the first aspect, a fifth aspect provides a method for neural network processing corresponding to the device for neural network processing provided in the second aspect, and a sixth aspect provides a method for neural network processing corresponding to the system for neural network processing provided in the third aspect. For the content that is not described in detail, reference may be made to the above device embodiments in the first aspect, which will not be repeated redundantly here for brevity.

For the relevant explanations and beneficial effects of the methods for neural network processing provided in the fourth, fifth and sixth aspects, corresponding reference may be made to the description in the first, second and third aspects, which will not be repeated redundantly hereinafter.

In the fourth aspect, a method for neural network processing is provided, and the method includes: executing, by a first computing array, a first type of neural network operation; and executing, by a second computing array, a second type of neural network operation, the second type of neural network operation being different from the first type of neural network operation.

The method may be executed by the device for neural network processing provided in the first aspect.

For the description of the first computing array and the second computing array, reference is made to the above description, which will not be repeated redundantly here.

In some implementations, the method further includes: reading, from a first storage module, a weight required for a convolution operation into the first computing array, and reading, from a second storage module, feature data required for the convolution operation into the first computing array, the second storage module being disposed separately from the first storage module.

Optionally, the method further includes: reading, from the second storage module, data required for the second type of neural network operation into the second computing array.

In some implementation manners, the reading, from the first storage module, the weight required for the convolution operation into the first computing array, and reading, from the second storage module, the feature data required for the convolution operation into the first computing array, includes: reading, from the first storage module and the second storage module, the weight and the feature data required for the convolution operation in parallel into the first computing array.

In some implementation manners, the reading, from the second storage module, the feature data required for the convolution operation into the first computing array, includes: reading, from a cache, the feature data required for the convolution operation into the first computing array, the cache being configured to cache the feature data required for the convolution operation that is read from the second storage module.

In some implementation manners, the reading, from the cache, the feature data required for the convolution operation into the first computing array, includes: determining whether the cache has the feature data required for the convolution operation executed by the first computing array; and if a determination result is yes, reading, from the cache, the feature data required for the convolution operation into the first computing array; or if a determination result is no, reading, from the second storage module, required feature data into the cache, and reading, from the cache, the feature data required for the convolution operation into the first computing array.

In some implementation manners, a distance between the cache and the first computing array is less than a distance between the second storage module and the first computing array.

In some implementation manners, the method further includes: reading, from a third storage module, data required for the first type neural network operation into the first computing array, and reading, from a fourth storage module, data required for the second type neural network operation into the second computing array, the fourth storage module being disposed separately from the third storage module.

Optionally, a distance between the third storage module and the first computing array is less than a distance between the fourth storage module and the first computing array; and/or a distance between the fourth storage module and the second computing array is less than a distance between the third storage module and the second computing array.

In the fifth aspect, a method for neural network processing is provided, and the method includes: reading, from a first storage module, a weight required for a convolution operation into a first computing array, and reading, from a second storage module, feature data required for the convolution operation into the first computing array, the second storage module being disposed separately from the first storage module; and executing, by the first computing array, the convolution operation on the feature data and the weight.

The method may be executed by the device for neural network processing provided in the second aspect.

In some implementation manners, the reading, from the first storage module, the weight required for the convolution operation into the first computing array, and reading, from the second storage module, the feature data required for the convolution operation into the first computing array, includes: reading, from the first storage module and the second storage module, the weight and the feature data required for the convolution operation in parallel into the first computing array.

In some implementation manners, the reading, from the second storage module, the feature data required for the convolution operation into the first computing array, includes: reading, from a cache, the feature data required for the convolution operation into the first computing array, the cache being configured to cache the feature data required for the convolution operation that is read from the second storage module.

In some implementation manners, the reading, from the cache, the feature data required for the convolution operation into the first computing array, includes: determining whether the cache has the feature data required for the convolution operation executed by the first computing array; and if a determination result is yes, reading, from the cache, the feature data required for the convolution operation into the first computing array; or if a determination result is no, reading, from the second storage module, required feature data into the cache, and reading, from the cache, the feature data required for the convolution operation into the first computing array.

In some implementation manners, a distance between the cache and the first computing array is less than a distance between the second storage module and the first computing array.

In the sixth aspect, a method for neural network processing is provided, and the method includes: reading, from a storage unit, data required for neural network operations to one or more processing units, a processing unit being the device for neural network processing provided in the first aspect or the second aspect; and executing, by the one or more processing units, the neural network operations, respectively.

The method may be executed by the system for neural network processing provided in the third aspect.

In some implementation manners, the executing, by the one or more processing units, the neural network operations, respectively, includes: executing, by the more processing units, a plurality of neural network operations in parallel.

In some implementation manners, in a case that the more processing units are configured to execute operations of a same neural network, the reading, from the storage unit, the data required for the neural network operation to the one or more processing units, includes: broadcasting data shared by the more processing units that is stored in the storage unit into the more processing units.

In some implementation manners, different processing units of the more processing units are configured to execute operations of different neural networks.

Based on the above description, according to the device, system and method for neural network processing provided in the embodiments of the present disclosure, acceleration of multiple types of operations in a neural network could be achieved, and thus computational efficiency of a deep neural network could be improved.

BRIEF DESCRIPTION OF DRAWINGS

One or more embodiments are exemplarily described by corresponding accompanying drawings, and these exemplary illustrations and accompanying drawings constitute no limitation on the embodiments. Elements with the same reference numerals in the accompanying drawings are illustrated as similar elements, and the drawings are not limiting to scale, in which:

FIG. 14 is a schematic flowchart of a method for neural network processing provided in an embodiment of the present disclosure;

FIG. 15 is another schematic flowchart of a method for neural network processing provided in an embodiment of the present disclosure; and FIG. 16 is another schematic flowchart of a method for neural network processing provided in an embodiment of the present disclosure.

DESCRIPTION OF EMBODIMENTS

Figure 1:
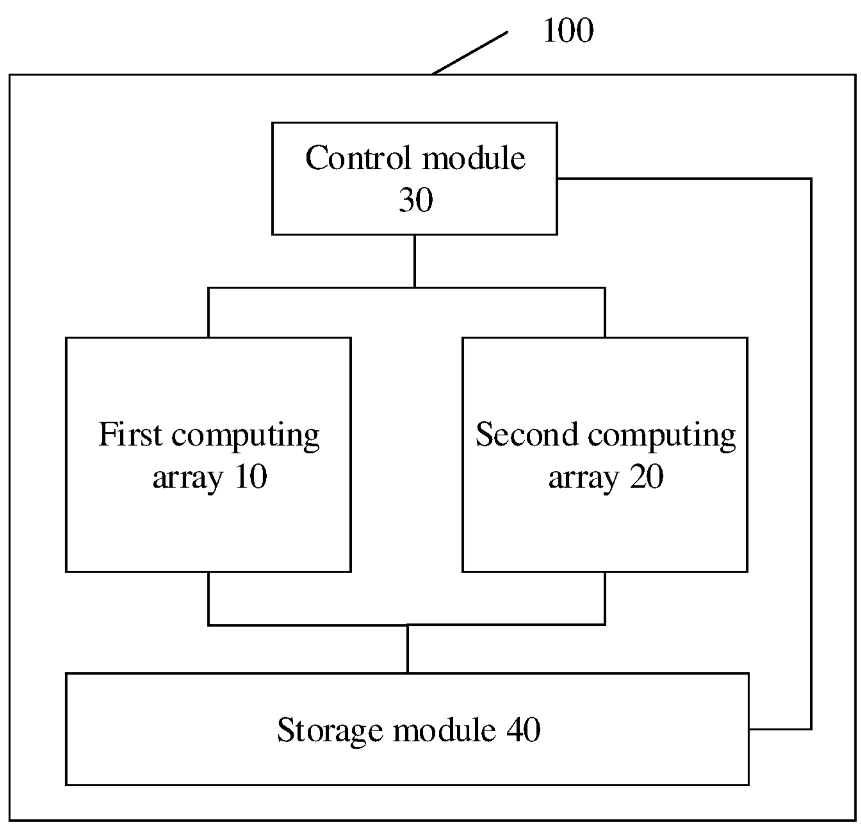
FIG. 1 is a schematic block diagram of a device for neural network processing provided in an embodiment of the present disclosure.

In order to understand features and technical contents of embodiments of the present disclosure in detail, implementations of the embodiments of the present disclosure will be described in detail below with reference to the accompanying drawings, and the attached drawings are only for reference and illustration purposes, and are not intended to limit the embodiments of the present disclosure. In the following technical description, for ease of explanation, numerous details are set forth to provide a thorough understanding of the disclosed embodiments. One or more embodiments, however, may be practiced without these details. In other cases, well-known structures and apparatuses may be shown simplified in order to simplify the drawings.

In order to understand the technical solutions of the embodiments of the present disclosure better, concepts involved in the embodiments of the present disclosure will be described below first.

1. Deep Learning

Artificial intelligence (AI) is new technical science that studies and develops theories, methods, techniques and application systems for simulating, extending and expanding human intelligence. Machine learning (ML) is the kernel of the artificial intelligence, and the objective is to allow a machine (a computer in a broad sense) to obtain human-like intelligence through learning. Deep learning (DL) is a machine learning algorithm. The deep learning has good application prospects in the fields of image processing, pattern recognition, speech recognition, natural languages, and the like.

The deep learning is essentially a deep neural network. A neural network of the deep learning may be referred to as a deep neural network. The deep neural network includes an input layer, several hidden layers and an output layer. Among them, the input layer is used to input an input value (an input feature value) for the neural network. The output of each hidden layer is a sum of products of a set of weight values and their corresponding input feature values (that is, multiply accumulate). The output of each hidden layer may be referred to as an output feature value, which serves as an input feature value of a next hidden layer or the output layer.

Typical deep learning neural network models include a deep convolutional neural network (DCNN) model, a deep belief network, (DBN) model, a stacked auto-encoder network model, and the like. Among them, the deep convolutional neural network is a deep neural network in which an operation of at least one hidden layer is a convolution operation.

In an example of a deep convolutional neural network, an output value (which is output from an output layer) is obtained after any one or more of the following types of operations are performed on an input value (which is input from an input layer) of the deep convolutional neural network via a hidden layer:

convolution, transposed convolution or deconvolution, batch normalization (BN), scale, fully connected, concatenation, pooling, element-wise addition, activation, and the like.

In the embodiments of the present disclosure, an operation that may be involved in a hidden layer of a neural network is not limited.

For example, the operation involved in the hidden layer of the deep neural network may further include depthwise (DW) convolution and pointwise (PW) convolution, and these two convolutions are two steps after decomposition of a complete convolution operation. This convolution operation decomposed into two steps may also be referred to as depthwise separable convolution.

The operation of the depthwise (DW) convolution is different from a conventional convolution operation. In the DW convolution, one convolution kernel is responsible for one channel, and one channel is convoluted only by one convolution kernel. In the conventional convolution operation, however, each convolution kernel operates each channel of an input map. The number of output feature maps obtained after the DW convolution is the same as the number of channels of an input layer.

The pointwise (PW) convolution is performed on the output feature maps obtained after the DW convolution. The operation of the PW convolution is similar to the conventional convolution operation. The size of a convolution kernel of the PW convolution is $1\times1\times M$, and M represents the number of channels of a previous layer.

In the deep neural network, each layer is usually named with the function it implements. For example, a layer that implements a convolution operation is referred to as a convolution layer, and a layer that implements a pooling operation is referred to as a pooling layer. For example, hidden layers of the deep convolutional neural network may include: a transposed convolution layer, a batch normalization layer, a scale layer, a fully connected layer, a concatenation layer, an element-wise addition layer, an activation layer, and the like. For the specific operation flow of each layer, reference may be made to the prior art, which will not be repeated redundantly herein.

2. Neural Network Accelerator

It can be seen from the foregoing description of the deep learning that the deep learning needs to process a large amount of data. With the development of the deep learning, computational requirements for the deep learning are becoming higher and higher, and conventional processors have been difficult to meet computational demands for the deep learning.

In response to the computational demands for the deep learning, a neural network specific processor is proposed in the field, including a tensor processing unit (TPU). The TPU in the prior art is a neural network specific processor based on a systolic array. The systolic array can play a good role in acceleration of a convolution operation.

It can be seen from the foregoing description of the deep learning that the deep learning involves multiple types of operations. In addition to the convolution operation, the deep learning may include other types of operations such as a pooling operation or a fully connected operation. Therefore, it is necessary to perform computational acceleration on multiple types of operations in the deep neural network.

The embodiments of the present disclosure provide a neural network processing method, device and system, which could achieve computational acceleration of multiple types of operations in a neural network. In other words, the solutions for neural network processing provided in the embodiments of the present disclosure could achieve further computational acceleration relative to the existing TPU.

Input feature data involved in the embodiments of the present disclosure represents data in an input feature map (IFMAP).

In other words, the input feature data represents data in a map matrix corresponding to a map to be performed with the neural network processing. The map matrix corresponding to the map to be performed with the neural network processing may also be referred to as an input feature matrix. The input feature matrix may be a two-dimensional matrix. For example, the input feature matrix is a matrix with a size of H×W. The input feature matrix may also be a multi-dimensional matrix. For example, the input feature matrix is a matrix with a size of H×W×R, which can be understood as two-dimensional matrixes of H×W of R channels. The input feature matrix is a multi-dimensional matrix, which can also be understood as that the input of the neural network includes a plurality of feature maps. For example, a feature matrix corresponding to a color map is H×W×3, that is, two-dimensional matrixes of H×W of 3 channels, and these 3 matrixes respectively correspond to three primary colors RGB of the map. H is referred to as a height of the input feature matrix, W is referred to as a width of the input feature matrix, and R is referred to as a depth of the input feature matrix. The input feature data may also be referred to as an input feature value.

Output feature data involved in the embodiments of the present disclosure represents data in an output feature map (OFMAP).

In other words, the output feature data represents data in an output feature matrix. The output feature matrix represents a matrix obtained after a neural network operation is performed on the input feature matrix. In an example of a convolution layer, the output feature matrix represents a matrix obtained after a convolution operation is performed on the input feature matrix and a filter matrix. The filter matrix represents a matrix constituted by weight values used by the convolution layer. The filter matrix may be a two-dimensional matrix. For example, the filter matrix is a matrix with a size of H×W. The filter matrix may also be a multi-dimensional matrix. For example, the filter matrix is a matrix with a size of H×W×R, which can be understood as R two-dimensional matrixes of H×W. For example, for a color map, a corresponding filter matrix should also be a three-dimensional matrix H×W×3, that is, 3 two-dimensional matrixes of H×W, and these 3 matrixes respectively correspond to three primary colors RGB of the map. H is referred to as a height of the filter matrix, W is referred to as a width of the filter matrix, and R is referred to as a depth of the filter matrix. The output feature data may also be referred to as an output feature value. Similarly, the output feature matrix may be a two-dimensional matrix. For example, the output feature matrix is a matrix with a size of H×W. The output feature matrix may also be a multi-dimensional matrix. For example, the output feature matrix is a matrix with a size of H×W×R. H is referred to as a height of the output feature matrix, W is referred to as a width of the output feature matrix, and R is referred to as a depth of the output feature matrix. It should be understood that the depth of the output feature matrix is the same as the depth of the filter matrix.

FIG. 1 is a schematic block diagram of a device 100 for neural network processing provided in an embodiment of the present disclosure. As shown in FIG. 1, the device 100 includes a first computing array 10, a second computing array 20 and a control module 30.

The first computing array 10 is configured to execute a first type of neural network operation, and the second computing array 20 is configured to execute a second type of neural network operation, where the second type of neural network operation is different from the first type of neural network operation.

The control module 30 is configured to control the first computing array 10 to execute the first type of neural network operation, and control the second computing array 20 to execute the second type of neural network operation.

The control module 30 may control the first computing array 10 to execute the first type of neural network operation by sending a command (or referred to as an instruction) for indicating the first type of neural network operation to the first computing array 10. The control module 30 may control the second computing array 20 to execute the second type of neural network operation by sending a command (or referred to as an instruction) for indicating the second type of neural network operation to the second computing array 20.

For example, the first type of neural network operation and the second type of neural network operation may be any one of the following types of operations, where the second type of neural network operation is different from the first type of neural network operation:

convolution, transposed convolution or deconvolution, batch normalization (BN), scale, fully connected, concatenation, pooling, element-wise addition activation, depthwise (DW) convolution, and pointwise (PW) convolution.

For example, when the first type of neural network operation is a convolution operation, the second type of neural network operation is any other operation of the above operation types except the convolution operation, for example, a pooling operation.

It should be noted that when the first type of neural network operation is a conventional convolution operation, the second type of neural network operation may be a depthwise (DW) convolution operation or a pointwise (PW) convolution operation.

The second type of neural network operation may include a vectorial operation. The vectorial operation represents an operation of multi-dimensional data and multi-dimensional data.

The second type of neural network operation may also include a scalar operation. The scalar operation represents an operation of single data and single data.

It should be understood that the device 100 provided in the embodiments of the present disclosure includes the first computing array 10 and the second computing array 20 configured to execute different types of operations in a neural network, where the first computing array 10 and the second computing array 20 may be configured to execute various types of operations. Therefore, the device 100 provided in the embodiments of the present disclosure may accelerate multiple types of operations.

It should also be understood that, as described above, the types of operations involved in the hidden layers of the deep neural network may include multiple types of operations described above, and it is necessary to accelerate multiple types of operations. It can be seen from the above that the device 100 provided in the embodiments of the present disclosure could solve this problem.

As an example, the first computing array 10 is configured to execute a convolution operation of a convolution layer in a deep neural network, the second computing array 20 is configured to execute a pooling operation of a pooling layer, and the device 100 provided in the embodiments of the present disclosure can accelerate the convolution layer and the pooling layer in the deep neural network (it is assumed that the deep neural network includes a convolution layer and a pooling layer).

As another example, the first computing array 10 is configured to execute a convolution operation of a convolution layer in a deep neural network, the second computing array 20 is configured to execute a fully connected operation of a fully connected layer, and the device 100 provided in the embodiments of the present disclosure can accelerate the convolution layer and the fully connected layer in the deep neural network (it is assumed that the deep neural network includes a convolution layer and a fully connected layer).

It should also be understood that the above is merely examples but not limitations. In practical applications, the types of operations that can be supported by the first computing array 10 and the second computing array 20 included in the device 100 provided in the embodiments of the present disclosure may be determined according to actual demands.

For example, the device 100 provided in the embodiments of the present disclosure may be regarded as a heterogeneous acceleration structure having "first computing array+second computing array". By adopting this heterogeneous acceleration structure, operations on multiple layers involved in the deep neural network could be accelerated, and operation efficiency of the neural network could be effectively improved.

Therefore, the device 100 provided in the embodiments of the present disclosure includes the first computing array 10 and the second computing array 20 configured to execute different types of operations in the neural network, so that the device 100 may accelerate multiple types of operations in the deep neural network.

It should be noted that FIG. 1 is merely an example but not a limitation. For example, the device 100 provided in the embodiments of the present disclosure may include more than two computing arrays. As the content described below with reference to FIG. 8 and FIG. 9, the device 100 provided in the embodiments of the present disclosure may include a plurality of second computing arrays 20. Description will be made below.

The control module 30 is further configured for instruction parsing.

For example, the control module 30 is configured to receive an upper-level instruction, parse the instruction, and determine a computational task to be executed by the device 100.

The control module 30 is further configured for control of computation flows of the first computing array 10 and the second computing array 20 and transmission of operands.

As an example, the control module 30 may control the first computing array 10 to execute the first type of neural network operation by executing the following operations: reading data required for the first type of neural network operation, and inputting it to the first computing array 10; and sending a command (or referred to as an instruction) indicating execution of the first type of neural network operation to the first computing array 10, so that the first computing array 10 executes the first type of neural network operation on the input data.

Similarly, the control module 30 may control the second computing array 20 to execute the second type of neural network operation by executing the following operations: reading data required for the second type of neural network operation, and inputting it to the second computing array 20; and sending a command (or referred to as an instruction) indicating execution of the second type of neural network operation to the second computing array 20, so that the second computing array 20 executes the second type of neural network operation on the input data.

Optionally, the control module 30 is further configured to store data (output results or intermediate results) obtained after the processing of the first computing array 10 and the second computing array 20 into an on-chip storage module. The on-chip storage module represents a storage module on the device 100.

Figure 2:
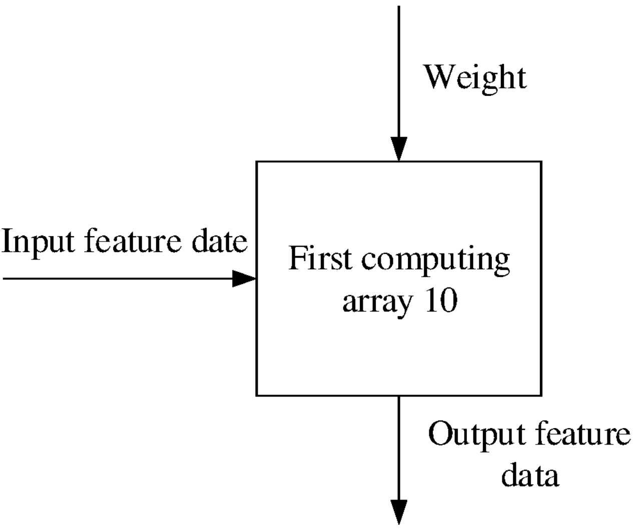
FIG. 2 is a schematic diagram of execution of a convolution operation by a first computing array in an embodiment of the present disclosure.

As an example, when the first type of neural network operation is a convolution operation, a computing unit in the first computing array 10 has a function of multiply accumulating, and a schematic diagram in which the control module 30 controls the first computing array 10 to execute the convolution operation is shown in FIG. 2. The control module 30 inputs input feature data and a weight required for the convolution operation to the first computing array 10. The first computing array 10 executes the convolution operation on the input input feature data and weight to obtain an output feature data. The input feature data and the weight required for the convolution operation may be read by the control module 30 from an on-chip storage module and input into the first computing array 10. The on-chip storage module represents a storage module on the device 100.

The operation of reading out data in an external (off-chip) storage module into the on-ship storage module may be executed by another related module, for example, by an intermediate unit 1040 (GDMAx) shown in FIG. 13 below, which is not limited in the embodiments of the present disclosure.

The first computing array 10 may execute the convolution operation on the input input feature data and weight by receiving a command from the control module 30.

The flow of controlling the first computing array 10 to execute the convolution operation by the control module 30 may also be expressed as that an input feature map (IFMAP and a weight required for the convolution operation are input to the first computing array 10; and the first computing array 10 executes the convolution operation on the input input feature map and weight to obtain an output feature map (OFMAP).

Figure 3:
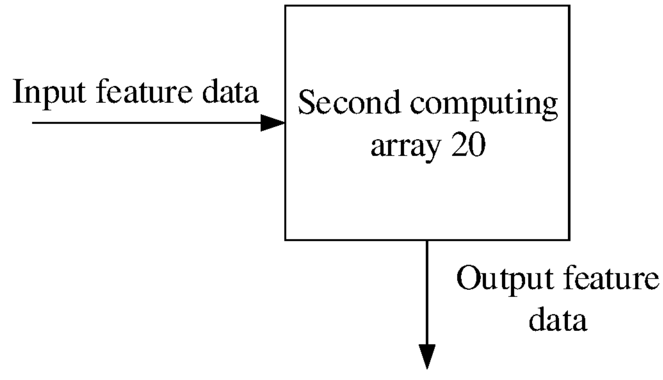
FIG. 3 is a schematic diagram of execution of a neural network operation by a second computing array in an embodiment of the present disclosure.

As an example, when the second type of neural network operation is a pooling operation, a schematic diagram in which the control module 30 controls the second computing array 20 to execute the pooling operation is shown in FIG. 3. The control module 30 inputs input feature data required for the pooling operation to the second computing array 20; and the second computing array 20 executes the pooling operation on the input input feature data according to the pooling operation manner and pooling box resolution, to obtain an output feature data.

For example, the pooling operation manner includes finding a maximum value or finding an average. For example, when the pooling operation manner is to find a maximum value, a computing unit in the second computing array 20 has a function of finding the maximum value. When the pooling operation manner is to find an average, a computing unit in the second computing array 20 has a function of finding the average. The pooling box resolution represents pooling (that is, downsampling) of what size of input feature data on an input feature map. It should be understood that the pooling operation manner and the pooling box resolution may be preset. For example, the control module 30 may obtain the pooling operation manner and the pooling box resolution by parsing an instruction.

The input feature data required for the pooling operation may be read by the control module 30 from the on-chip storage module and input into the second computing array 20.

The second computing array 20 may acquire the pooling operation manner and the pooling box resolution by receiving a command from the control module 30.

The flow of controlling the second computing array 20 to execute the pooling operation by the control module 30 may also be expressed as that an input feature map (IFMAP) required for the pooling operation is input to the second computing array 20; and the second computing array 20 executes the pooling operation on the input input feature map to obtain an output feature map (OFMAP).

Regarding the implementation method of a computing array for executing the pooling operation, reference may be made to the prior art, which will not be repeated redundantly herein.

Figure 7:
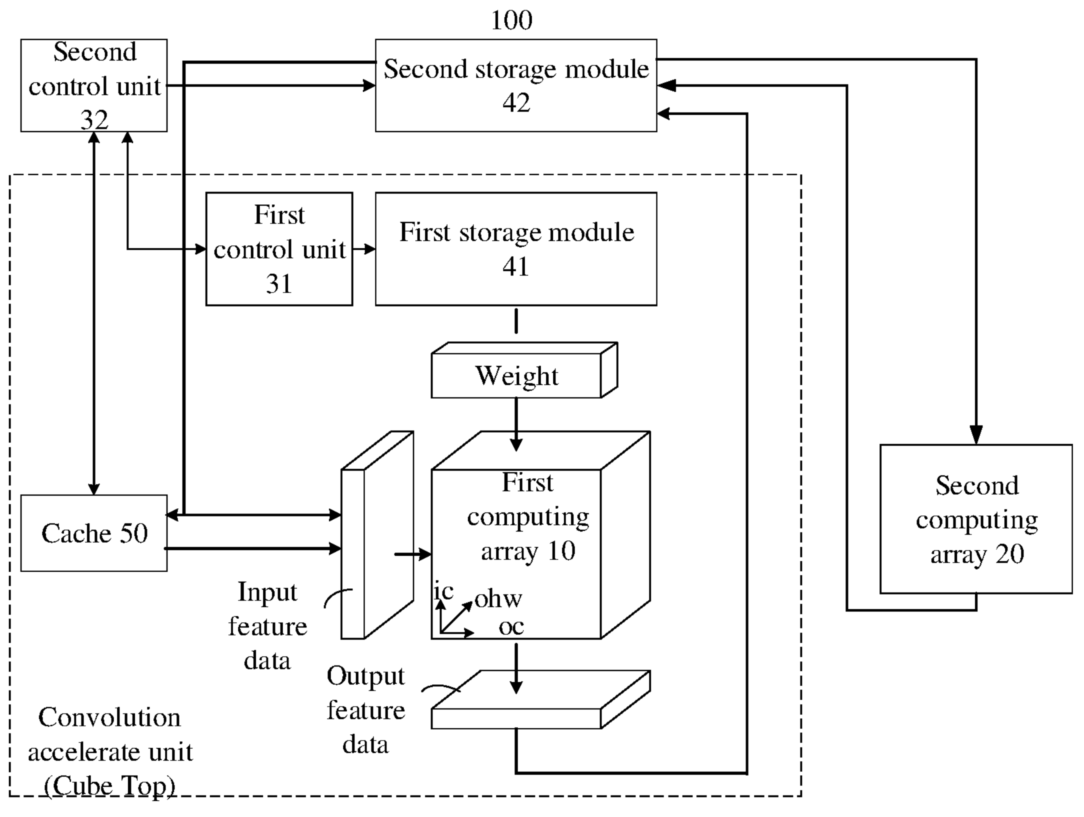
FIG. 7 is yet another schematic block diagram of a device for neural network processing provided in an embodiment of the present disclosure.

Optionally, in an embodiment in which the first type of neural network operation is a convolution operation, the first computing array 10 may be a three-dimensional (3D) multiply accumulate (MAC) array, as shown in FIG. 7.

Three dimensions of the 3D MAC array represent the number of computable channels of an input feature map (IFMAP), the number of channels of an output feature map (OFMAP) and the number of HWs of the OFMAP, respectively, where the number of HWs of the OFMAP represents the number of convolution windows that can be processed simultaneously.

For example, if the maximum values of these three dimensions are denoted as IC, OC and OHW, respectively, the number of MACs included in the first computing array 10 is IC×OC×OHW. The values of these three parameters IC, OC and OHW may be set according to different application scenarios and demands of a chip, so that the device may obtain a higher utilization ratio.

Optionally, in an embodiment in which the first type of neural network operation is a convolution operation, the first computing array 10 may be a systolic array.

For example, a weight flows into the systolic array from up to down and flows from up to down in the systolic array; and input feature data flows into the systolic array from left to right and flows from left to right in the systolic array.

An accumulation unit may be connected below the systolic array, and may be configured to save partial results in a case that an input feature matrix or a weight matrix exceeds the unit range of the systolic array.

Regarding the principle and the operation flow of the systolic array, reference may be made to the prior art, which will not be repeated redundantly herein.

It should be understood that, in the above embodiments, the description is made by an example that the second type of neural network operation is a pooling operation, which is not limited in the embodiments of the present disclosure. For example, in a case that the first type of neural network operation is a convolution operation, the second type of neural network operation may be another type of operation except the convolution operation. It should also be understood that the structures and functions of the second computing array 20 and the computing unit therein are correspondingly different with the second type of neural network operation. In other words, the second computing array 20 may achieve different types of operations in the neural network.

Therefore, by including a plurality of computing arrays that can execute different types of operations in the neural network, generality of the device for neural network processing provided in the embodiments of the present disclosure could be improved.

Optionally, the control module 30 is configured to allow the first type of neural network operation and the second type of neural network operation to be executed in parallel by controlling the first computing array 10 to execute the first type of neural network operation and controlling the second computing array 20 to execute the second type of neural network operation.

For example, in the device 100 for neural network processing provided in the embodiments of the present disclosure, two instructions indicating different types of neural network operations may be run simultaneously through the cooperation of software. For example, an instruction indicating a convolution operation and an instruction indicating a pooling operation may be run simultaneously.

It should be understood that, by executing multiple types of operations in the neural network in parallel, the computational efficiency of the deep neural network could be effectively improved.

Optionally, the device 100 may further include an on-chip storage module, such as a storage module 40 shown in FIG. 1, and the storage module 40 is configured to store data to be processed by the first computing array 10 and the second computing array 20.

For example, the control module 30 is configured to: read out data required for the first type of neural network from the storage module 40 and input it into the first computing array 10, and read out data required for the second type of neural network from the storage module 40 and input it into the second computing array 20.

The operation of reading out data from an external (off-chip) storage module into the on-ship storage module may be executed by another related module, for example, by an intermediate unit 1040 (GDMAx) shown in FIG. 13 below, which is not limited in the embodiments of the present disclosure.

Optionally, the storage module 40 may be further configured to store operation results (final computation results or intermediate computation results) of the first computing array 10 and the second computing array 20.

Optionally, the storage module 40 may be logically partitioned into a plurality of storage modules.

For example, the storage module 40 may be logically partitioned into two storage modules for storing data for the first computing array 10 and the second computing array 20, respectively. For another example, the storage module 40 may be logically partitioned into a plurality of storage modules for storing different types of data, respectively.

Optionally, the storage module 40 may be physically partitioned into a plurality of storage modules. In other words, the device 100 may include a plurality of physically independent storage modules, and in this case, the storage module 40 may be regarded as a general term for the plurality of physically independent storage modules.

For example, the device 100 includes two storage modules for storing data for the first computing array 10 and the second computing array 20, respectively, and these two storage modules physically belong to two different storage modules. For another example, the device 100 includes a plurality of storage modules for storing different types of data, respectively, and some or all of the plurality of storage modules physically belong to different storage modules.

In the embodiments of the present disclosure, different types of data may be stored separately, and processing data of different computing arrays may also be stored separately. Description will be made below.

Figure 4:
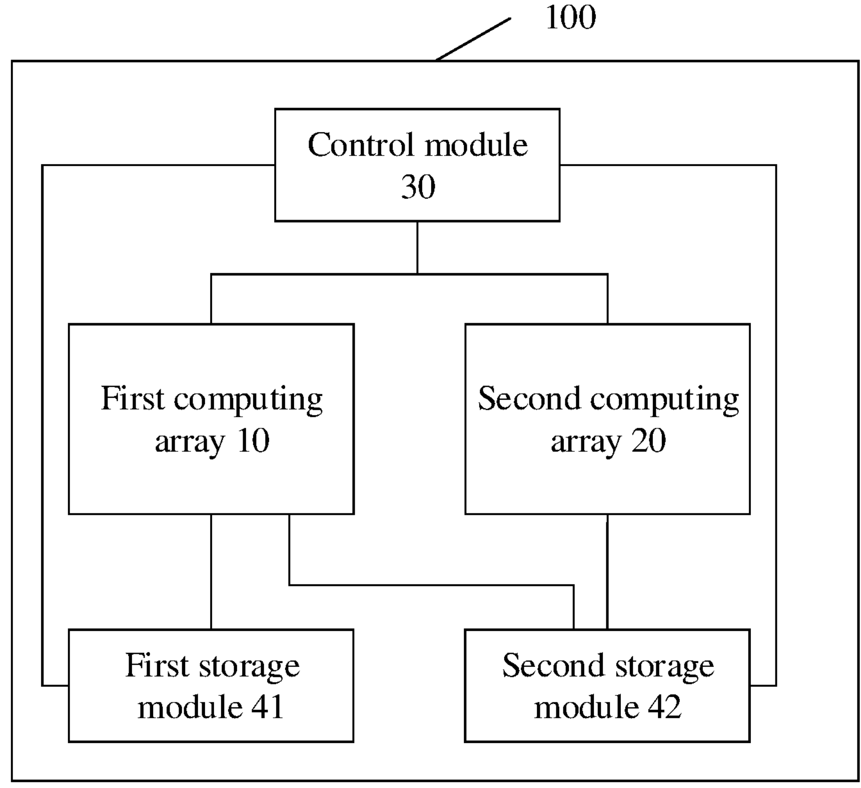
FIG. 4 is another schematic block diagram of a device for neural network processing provided in an embodiment of the present disclosure.

Optionally, as shown in FIG. 4, in an embodiment in which the first type of neural network operation is a convolution operation, the device further includes a first storage module 41 and a second storage module 42 that are disposed separately. The first storage module 41 is configured to store a weight required for the convolution operation, and the second storage module 42 is configured to store feature data required for the convolution operation. The control module 30 is configured to read the weight required for the convolution operation from the first storage module 41 to the first computing array 10, and read the feature data required for the convolution operation from the second storage module 42 to the first computing array 10.

For example, the first storage module 41 may be referred to as L1 weight Mem, and the second storage module 42 may be referred to as L1 Data Mem.

In the embodiment shown in FIG. 4, the first storage module 41 and the second storage module 42 are physically separated from each other. In other words, the first storage module 41 and the second storage module 42 are two physically different storage modules.

The first storage module 41 and the second storage module 42 are on-chip storage modules of the device 100.

For example, another related module, such as an intermediate unit 1040 (GDMAx) shown in FIG. 13 below, may read out the weight required for the convolution operation from an external storage and write it into the first storage module 41, and read out the input feature data required for the convolution operation from an external storage and write it into the second storage module 42, which is not limited in the embodiments of the present disclosure.

It should be understood that, according to this embodiment, by storing the feature data and the weight required for the convolution operation in the first storage module 41 and the second storage module 42 separately, the feature data and the weight required for the convolution operation can be read from two read ports, respectively, which could improve efficiency of data reading.

Optionally, in the embodiment shown in FIG. 4, the control module 30 is configured to read the weight and the feature data required for the convolution operation in parallel from the first storage module 41 and the second storage module 42.

It should be understood that, by reading the feature data and the weight required for the convolution operation in parallel, data reading efficiency during the convolutional neural network processing could be improved, and thus the overall efficiency of the convolutional neural network processing can be improved.

Therefore, according to the device 100 for neural network processing provided in the embodiments of the present disclosure, by using two storage modules to separately store the feature data and the weight required for the convolution operation, the feature data and the weight required for the convolution operation can be read from two read ports, respectively, which could improve the efficiency of data reading, thereby improving the overall efficiency of the convolutional neural network processing.

Optionally, in the embodiment shown in FIG. 4, the device 100 may further include a storage module (which is denoted as a storage module x) (not shown in FIG. 4) specific to storage of data required for the second type of neural network operation, where the control module 30 is configured to read the data required for the second type of neural network operation from the storage module x to the second computing array 20.

Optionally, in the embodiment shown in FIG. 4, the first computing array 10 and the second computing array 20 may share one data storage module. As shown in FIG. 4, the second storage module 42 may be further configured to store data required for the second type of neural network operation; where the control module 30 is further configured to read the data required for the second type of neural network operation from the second storage module 42 to the second computing array 20.

For example, the data stored in the second storage module 42 may be uniformly addressed. Before the data is read from the second storage module 42, a data storage address corresponding to a computational task to be performed is determined first, and then the corresponding data is read from the second storage module 42 according to the data storage address.

For example, for a convolution operation instruction, a storage address of data required for the convolution operation in the second storage module 42 is determined first, and then data of the storage address is read from the second storage module 42 and transmitted into the first computing array 10. For another example, the second type of neural network operation is a pooling operation, a storage address of data required for the pooling operation in the second storage module 42 is determined first, and then data of the storage address is read from the second storage module 42 and transmitted into the second computing array 20.

It should be understood that, by sharing one data storage module with the first computing array 10 and the second computing array 20, the space occupied by the storage module could be reduced.

Figure 5:
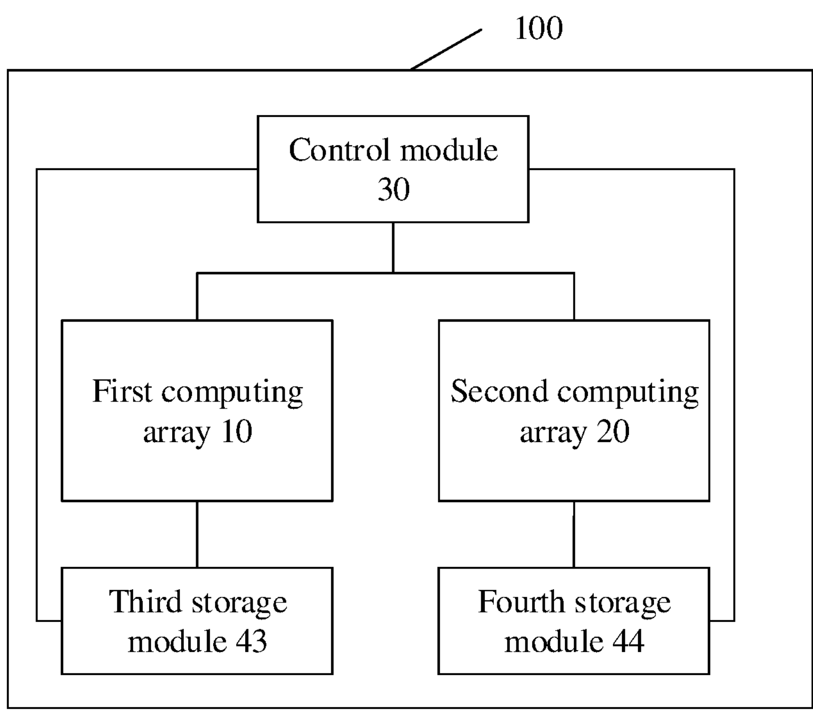
FIG. 5 is still another schematic block diagram of a device for neural network processing provided in an embodiment of the present disclosure.

Optionally, as another embodiment, as shown in FIG. 5, the device 100 includes a third storage module 43 and a fourth storage module 44 that are disposed separately. The third storage module 43 is configured to store data required for the first type of neural network operation, and the fourth storage module 44 is configured to store data required for the second type of neural network operation. The control module 30 is configured to read the data required for the first type of neural network operation from the third storage module 43 to the first computing array 10, and read the data required for the second type of neural network operation from the fourth storage module 44 to the second computing array 20.

In the embodiment shown in FIG. 5, the third storage module 43 and the fourth storage module 44 are physically separated from each other. In other words, the third storage module 43 and the fourth storage module 44 are two physically different storage modules.

The third storage module 43 and the fourth storage module 44 are on-chip storage modules of the device 100.

For example, another related module, such as an intermediate unit 1040 (GDMAx) shown in FIG. 13 below, may read out the data required for the first type of neural network operation from an external storage and write it into the third storage module 43, and read out the data required for the second type of neural network operation from an external storage and write it into the fourth storage module 44, which is not limited in the embodiments of the present disclosure.

As an example, the first type of neural network operation is a convolution operation, the second type of neural network operation is a pooling operation, the third storage module 43 is configured to store feature data and a weight required for the convolution operation, and the fourth storage module 44 is configured to store feature data required for the pooling operation.

It should be understood that, according to this embodiment, separate storage of the data required for the first type of neural network operation and the data required for the second type of neural network operation is achieved by the third storage module 43 and the fourth storage module 44.

It should also be understood that, according to this embodiment, by storing the data required for the first type of neural network operation and the data required for the second type of neural network operation in the third storage module 43 and the fourth storage module 44, respectively, the data required for the first neural network operation and the second neural network operation can be read from two read ports, respectively, which could improve efficiency of data reading.

Optionally, in the embodiment shown in FIG. 5, the control module 30 is configured to read the data required for the first neural network operation and the data required for the second type of neural network operation in parallel from the third storage module 43 and the fourth storage module 44.

Therefore, according to the device for neural network processing provided in the embodiments of the present disclosure, by using two storage modules to separately store the data required for the first neural network operation and the data required for the second neural network operation, the data required for the first neural network operation and the data required for the second neural network operation can be read from two read ports, respectively, which could improve the data reading efficiency, thereby improving the computational efficiency of the neural network.

Optionally, in the embodiment shown in FIG. 5, in a case that the first type of neural network operation is a convolution operation, the third storage module 43 may be logically or physically partitioned into two sub-storage units, where one sub-storage unit is configured to store feature data required for the convolution operation, and the other is configured to store a weight required for the convolution operation.

It can be seen from the above that the storage module included in the device 100 for neural network processing provided in the embodiments of the present disclosure has various implementation manners.

For example, the device 100 includes the storage module 40 as shown in FIG. 1. For another example, the device 100 includes the first storage module 41 and the second storage module 42 as shown in FIG. 4. For yet another example, the device 100 includes the third storage module 43 and the fourth storage module 44 as shown in FIG. 5.

Optionally, that the device 100 includes the first storage module 41 and the second storage module 42, mentioned in the embodiments of the present disclosure, indicates that the device 100 includes a storage module including two read ports, and the two read ports respectively correspond to the first storage module 41 and the second storage module 42.

Optionally, that the device 100 includes the third storage module 43 and the fourth storage module 44, mentioned in the embodiments of the present disclosure, indicates that the device 100 includes a storage module including two read ports, and the two read ports respectively correspond to the third storage module 43 and the fourth storage module 44.

With continuing reference to FIG. 4, optionally, in the embodiment shown in FIG. 4, a distance between the first storage module 41 and the first computing array 10 is less than a distance between the second storage module 42 and the first computing array 10.

Since the distance between the first storage module 41 and the first computing array 10 is relatively short, the time to read the weight from the first storage module 41 to the first computing array 10 is reduced, which could improve the efficiency of reading the weight in the convolution operation, and reduce the power consumption of reading the weight in the convolution operation.

It should be understood that the second storage module 42 may be far away from the first computing array 10 in a case that the second storage module 42 is further configured to store data required for the second type of neural network operation.

With continuing reference to FIG. 5, optionally, in the embodiment shown in FIG. 5, a distance between the third storage module 43 and the first computing array 10 is less than a distance between the fourth storage module 44 and the first computing array 10; and/or a distance between the fourth storage module 44 and the second computing array 20 is less than a distance between the third storage module 43 and the second computing array 20.

It should be understood that, since the distance between the third storage module 43 and the first computing array 10 is relatively short, the time to read the data required for the first type of neural network operation from the third storage module 43 to the first computing array 10 is reduced, and since the distance between the fourth storage module 44 and the second computing array 20 is relatively short, the time to read the data required for the second type of neural network operation from the fourth storage module 44 to the second computing array 20 is reduced, which could improve the efficiency of data reading, and reduce the power consumption of data reading.

Figure 6:
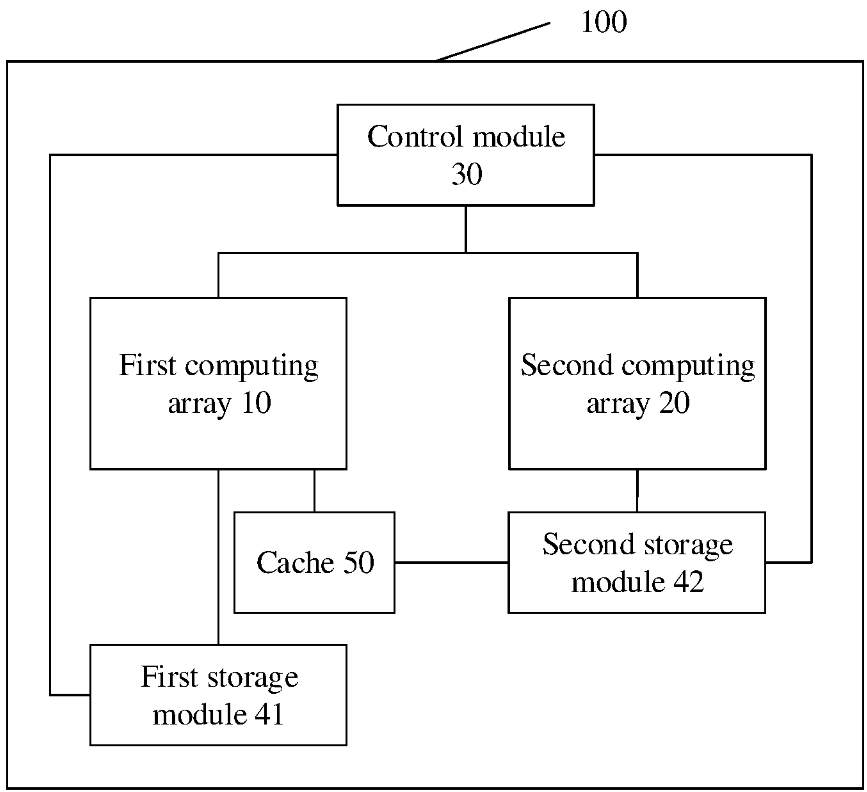
FIG. 6 is yet another schematic block diagram of a device for neural network processing provided in an embodiment of the present disclosure.

Optionally, in the embodiment shown in FIG. 4, the device 100 may further include a cache 50, as shown in FIG. 6, where the control module 30 is configured to read the feature data required for the convolution operation from the cache to the first computing array 10.

This embodiment can be applied to a scenario where the first type of neural network operation is a convolution operation.

It should be understood that the input feature data of the convolution operation has good locality, and thus the input feature data for the convolution operation may be read out from the second storage module 42 and cached into the cache 50 with this good locality.

The access speed of the cache is fast, and thus, by using the cache to cache the feature data required for the convolution operation, the reading efficiency of the feature data required for the convolution operation can be improved, and the power consumption of data reading can be reduced.

In addition, if the second storage module 42 is far away from the first computing array 10, the first computing array 10 takes long time to read the data from the second storage module 42 with high power consumption. In the embodiments of the present disclosure, by using the cache to cache the data read from the first storage module 41, the first computing array 10 reads the data from the cache, which can reduce the times of reading to the second storage module 42, and reduce the time to read the data, thereby reducing the power consumption of the convolution operation.

The control module 30 is configured to: read feature data required for the convolution operation executed by the first computing array 10 from the second storage module 42 into the cache 50 in a case that the cache 50 does not include the feature data; or read feature data required for the convolution operation executed by the first computing array 10 directly from the second storage module 42 into the first computing array 10 in a case that the cache 50 already includes the feature data.

For example, the control module 30 may read the required feature data from the second storage module 42 into the cache 50 in advance, and read the feature data required for the convolution operation directly from the cache into the first computing array 10 during the execution of the convolution operation by the first computing array 10.

For another example, the control module 30 may read the required feature data from the second storage module 42 into the cache 50 in real time according to actual situations. For example, the control module 30 is configured to execute the following steps.

1) Whether the cache 50 has the feature data required for the convolution operation executed by the first computing array 10 is determined; and
2) if a determination result is yes, the feature data required for the convolution operation is read from the cache 50 to the first computing array 10; or
3) if a determination result is no, required feature data is read from the second storage module 42 into the cache 50, and the feature data required for the convolution operation is read from the cache 50 to the first computing array 10.

In the embodiment shown in FIG. 6, a distance between the cache 50 and the first computing array 10 is less than a distance between the second storage module 42 and the first computing array 10.

Therefore, in the embodiments of the present disclosure, by using the cache to cache the data read from the first storage module 41, the first computing array 10 reads the data from the cache, which can reduce the times of reading to the second storage module 42, and reduce the time to read the data, thereby reducing the power consumption of the convolution operation. In addition, the efficiency of data reading in the convolution operation could also be improved.

Optionally, in the embodiment shown in FIG. 6, a distance between the first storage module 41 and the first computing array 10 is less than a distance between the second storage module 42 and the first computing array 10.

It should be understood that, since the distance between the first storage module 41 and the first computing array 10 is relatively short, the time to transmit the weight stored in the first storage module 41 to the first computing array 10 can be reduced, and thus the overhead of reading the weight from the first storage module 41 by the first computing array 10 can be reduced.

Therefore, in this embodiment, both the reading efficiency of the feature data required for the convolution operation and the reading efficiency of the weight required for the convolution operation can be improved, and thus the efficiency of the convolutional neural network operation can be improved. Meanwhile, in this embodiment, since the reading efficiency of the feature data and the weight required for the convolution operation is improved, the power consumption can be reduced.

The device 100 may include one control module, that is, the control module 30 represents one control unit.

Optionally, in some embodiments, the control module 30 in the device 100 may include a plurality of control units, and different control units are configured to execute different control operations. There may be handshake signals between the plurality of control units.

As shown in FIG. 7, the first type of neural network operation is a convolution operation, that is, the first computing array 10 is configured to execute the convolution operation, and the control module 30 includes a first control unit 31 and a second control unit 32.

The first control unit 31 is configured to control the flow of the convolution operation and the transport of a weigh required during the convolution operation. The transport here indicates that the weight is read out into the first computing array 10.

The second control unit 32 is configured to integrally control the computation flows of the first computing array 10 and the second computing array 20. For example, the second control unit 32 is configured to be responsible for the transport of input feature data required during the convolution operation, and is further configured to be responsible for the transport of data required for the second type of neural network operation executed by the second computing array 20. The second control unit 32 may be further configured to store operation results of the first computing array 10 and the second computing array 20 in the second storage module 42.

There may be handshake signals between the first control unit 31 and the second control unit 32 to complete the transmission of the input feature data and the weight required for the convolution operation in cooperation.

In the example of FIG. 7, the first control unit 31 is configured to read the weight required for the convolution operation from the first storage module 41 to the first computing array 10.

The second control unit 32 is configured to read out the feature data required for the convolution operation from the second storage module 42 and write it into the cache 50. When the first computing array 10 is to execute the convolution operation, the second control unit 32 is configured to read the feature data required for the convolution operation from the cache 50 to the first computing array 10.

For example, the second control unit 32 is configured to execute the following steps.

1) Whether the cache 50 has the feature data required for the convolution operation executed by the first computing array 10 is determined; and
2) if a determination result is yes, the feature data required for the convolution operation is read from the cache 50 to the first computing array 10; or
3) if a determination result is no, required feature data is read from the second storage module 42 into the cache 50, and the feature data required for the convolution operation is read from the cache 50 to the first computing array 10.

The second control unit 32 is further configured to read the data required for the second type of neural network operation from the second storage module 42 to the second computing array 20.

The second control unit 32 may be in communication with the first control unit 31. For example, the second control unit 32 may send a command to the first control unit 31, for example, to indicate the first control unit 31 to read the weight in the first storage module 31 into the first computing array 10.

For another example, in the embodiment shown in FIG. 5, the control module 30 includes a first control unit and a second control unit. The first control unit is configured to read the data required for the first type of neural network operation from the third storage module 43 to the first computing array 10; and the second control unit is configured to read the data required for the second type of neural network operation from the fourth storage module 44 to the second computing array 20.

Optionally, the device 100 for neural network processing provided in the embodiments of the present disclosure may include a plurality of second computing arrays 20.

Each second computing array 20 may support one or more types of operations.

For example, each second computing array 20 may support operation instructions of any one or more of the following operation types:

transposed convolution or deconvolution, batch normalization (BN), scale, fully connected, concatenation, pooling, element-wise addition, activation, depthwise (DW) convolution, and pointwise (PW) convolution.

Optionally, in an embodiment in which the device 100 includes a plurality of second computing arrays 20, the plurality of second computing arrays 20 may be configured to execute a same type of operations in the neural network.

As an example, the device 100 includes a plurality of second computing arrays 20, and the plurality of second computing arrays 20 are configured to execute pooling operations.

It should be understood that, by executing pooling operations through a plurality of computing arrays, the computational efficiency of the pooling operations can be effectively improved to achieve the acceleration of the pooling operations.

As another example, the device 100 includes a plurality of second computing arrays 20, and the plurality of second computing arrays 20 are configured to execute fully connected operations.

It should be understood that, by executing fully connected operations through a plurality of computing arrays, the computational efficiency of the fully connected operations can be effectively improved to achieve the acceleration of the fully connected operations.

It should also be understood that the above is merely examples but not limitations. In an embodiment in which the device 100 includes a plurality of second computing arrays 20, the plurality of second computing arrays 20 may be further configured to execute the same other type of operations, which will not be enumerated here.

Therefore, in the device 100 provided in the embodiments of the present disclosure, by using a plurality of second computing arrays 20 to execute the same type of operations in the neural network, the computational efficiency of the corresponding type of operations can be effectively improved.

It should be noted that, in practical applications, the types of operations that can be supported by the plurality of second computing arrays 20 included in the device 100 provided in the embodiments of the present disclosure may be determined according to actual demands.

It should also be noted that the description of the second computing array 20 in the above embodiments is applicable to each of the plurality of second computing arrays 20 in this embodiment. Reference is made to the above for details, which will not be repeated redundantly here.

Figure 8:
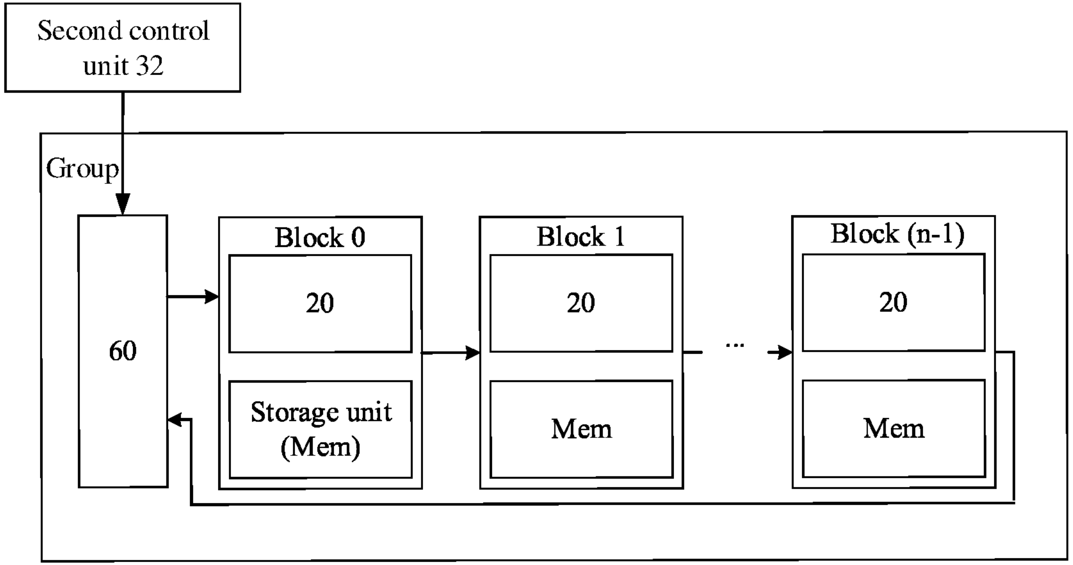
FIG. 8 is a schematic diagram of a plurality of second computing arrays included in a device for neural network processing provided in an embodiment of the present disclosure.

As an example, FIG. 8 is a schematic diagram of a plurality of second computing arrays 20 included in the device 100. In FIG. 8, the device 100 includes n second computing arrays 20, where n is a positive integer. In FIG. 8, each second computing array 20 corresponds to a storage unit (Mem). The entirety of each second computing array 20 and a storage unit (Mem) therein may be denoted as a block, as shown in FIG. 8. For example, this block may also be denoted as a core, a block or a lane. As shown in FIG. 8, the device 100 includes n blocks (block 0~block (n−1)). For example, a storage unit (Mem) in block 0 shown in FIG. 8 represents a storage unit for storing data required for a neural network operation executed by a second computing array 20 in block 0.

It should be noted that the n storage units shown in FIG. 8 may be physically separated from each other, and logically be a same storage unit.

For example, in the embodiment shown in FIG. 4, the n storage units shown in FIG. 8 are logically a same storage unit: the second storage module 42.

For another example, in the embodiment shown in FIG. 5, the n storage units shown in FIG. 8 are logically a same storage unit: the fourth storage module 44.

With continuing reference to FIG. 8, the n second computing arrays 20 included in the device 100 may be regarded as a group, and this group may be referred to as an Array.

Optionally, as shown in FIG. 8, the device 100 may further include an array interconnection structure 60 configured to be responsible for command and data transfer between a control module (for example, the second control unit 32 shown in FIG. 8) and each second computing array 20 in the group constituted by the n second computing arrays 20.

For example, the array interconnection structure 60 may be a bus interconnection structure or a connection structure in another form.

For example, the array interconnect structure 60 may be referred to as an Array Fabx.

The array interconnection structure 60 may be in communication with the control module of the device 100. For example, in the embodiment shown in FIG. 7, the array interconnection structure 60 may be in communication with the second control unit 32, as shown in FIG. 8.

Figure 9:
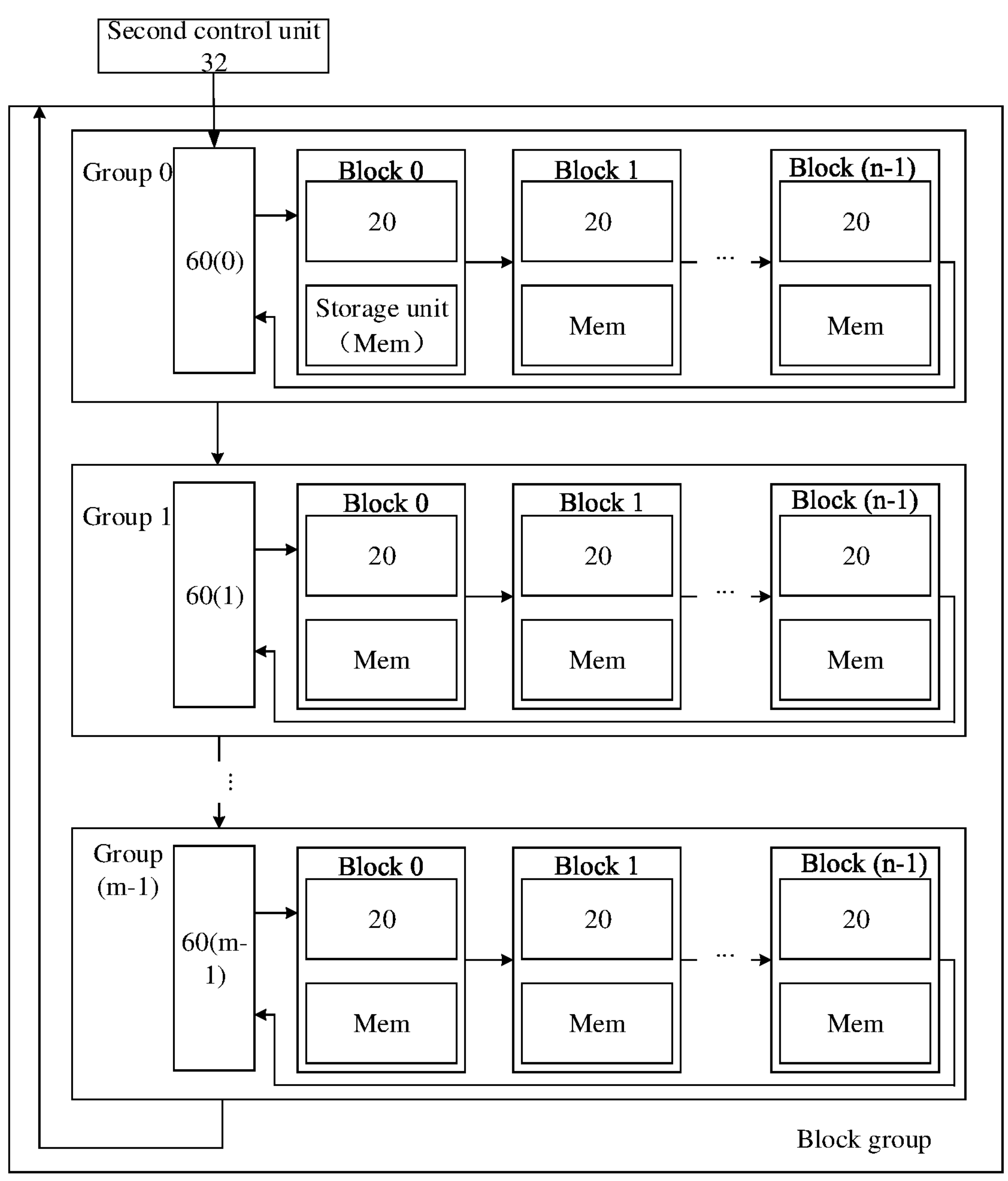
FIG. 9 is another schematic diagram of a plurality of second computing arrays included in a device for neural network processing provided in an embodiment of the present disclosure.

Optionally, as shown in FIG. 9, the device 100 may include m groups (group 0~group (m−1) shown in FIG. 9) shown in FIG. 8, that is, including n×m second computing arrays 20, where m is a positive integer. Each group includes an array interconnection structure 60. The array interconnect structure 60 of each group (Array) may be referred to as an Array Fab i (i being 0~m−1).

For example, the entirety of the m groups (Array) in FIG. 9 may be denoted as a block group (lane Array).

In the embodiment of FIG. 4, a storage unit (Mem) in each block (Lane) in FIG. 9 may be a logically partitioned unit in the second storage module 42. The data stored in the second storage module 42 may be uniformly addressed, and the storage unit (Mem) in each block (Lane) may correspond to a segment of the storage address in the second storage module 42.

For example, in order to execute a neural network operation using a second computing array 20 in a certain block (Lane), a storage address of a storage unit (Mem) in this block (Lane) in the second storage module 42 is determined first, and then the data of the storage address is read from the second storage module 42 and transmitted to the second computing array 20 of this block (Lane).

For example, in the embodiment shown in FIG. 9, if the device 100 needs to execute a task of pooling operations, the execution process is provided as follows.

1) The control module 30 parses a system instruction, learns that a pooling operation is to be executed, and determines an identifier (ID) of a block (Lane) for executing the pooling operation, and it is assumed that the identifier is 0_1, that is, the second computing array 20 in block 1 of group 0 is configured to execute the pooling operation.

It should be understood that the block for executing the pooling operation may include one or more blocks, and the description is made by an example of one block here, which is merely an example but not a limitation.

2) The control module 30 sends an instruction reading an input feature map (IFMAP) and an instruction reading a pooling kernel to a storage unit (Mem) in block 1 of group 0 through two read channels (for example, which may be referred to as r0 and r1). Channel r0 is responsible for reading of an input feature map, and r1 is responsible for reading of the pooling kernel. The pooling kernel mentioned here corresponds to the pooling box size mentioned above.

After being read from the storage unit corresponding to block 1 of group 0, the input feature map (IFMAP) and the pooling kernel are sent to the second computing array 20 in block 1 of group 0 for the pooling operation.

The input feature map (IFMAP) and the pooling kernel are read from the storage unit (Mem) in block 1 of group 0, which is essentially that the input feature map (IFMAP) and the pooling kernel are read at a corresponding address in the second storage module 42 from the storage unit (Mem) in block 1 of group 0.

3) After the pooling operation is completed, the control module 30 sends a write command through a write port to write a pooling result obtained by the second computing array 20 in block 1 of group 0 into the storage unit corresponding to block 1 of group 0.

It should be noted that, in practical applications, the number of second computing arrays 20 included in the device 100 may be determined according to actual demands.

In the embodiment shown in FIG. 4, a module or region where the second computing array 20 and the second storage module 42 are located may be denoted as a group block (Array Lane), as shown in FIG. 9.

In the embodiment shown in FIG. 4, a module or region where the first computing array 10 and the first storage module 41 are located may be denoted as a convolution accelerate unit (cony accelerate unit) (which may also be referred to as a Cube Top), as shown in FIG. 7.

Figure 10:
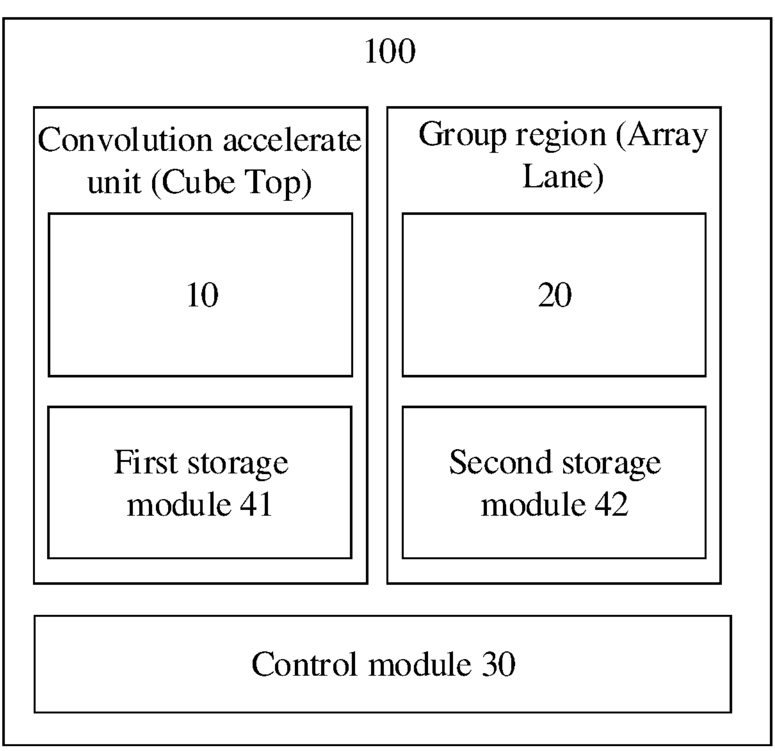
FIG. 10 is still another schematic block diagram of a device for neural network processing provided in an embodiment of the present disclosure.

As shown in FIG. 10, the device 100 for neural network processing provided in the embodiments of the present disclosure may be represented as being constituted by a convolution accelerate unit (Cube Top), a group block (Array Lane) and the control module 30.

Figure 11:
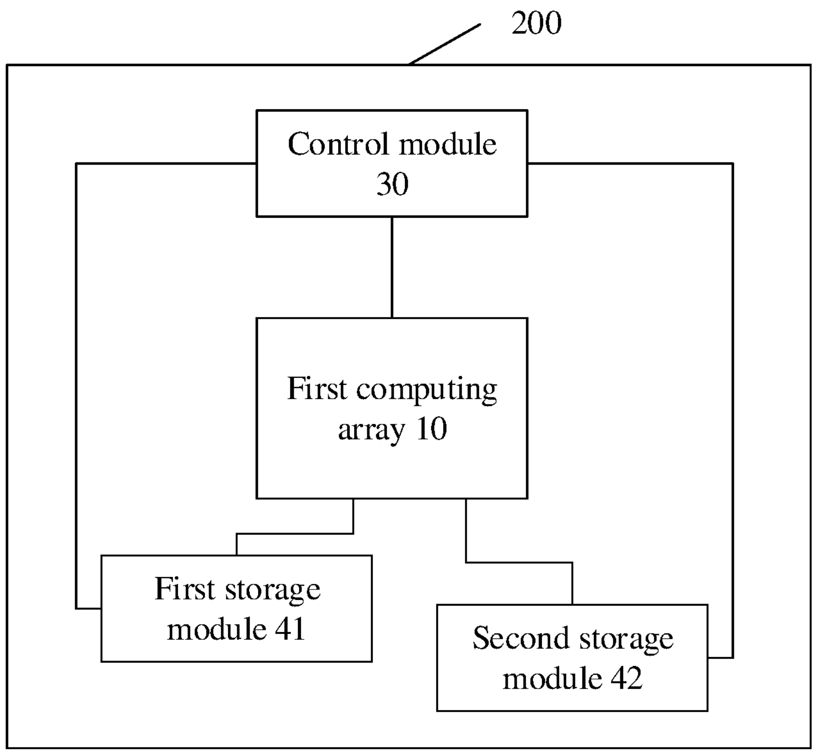
FIG. 11 is a schematic block diagram of a device for neural network processing provided in another embodiment of the present disclosure.

FIG. 11 is a schematic block diagram of a device 200 for neural network processing provided in another embodiment of the present disclosure. The device 200 includes a first computing array 10, a first storage module 41, a second storage module 42 and a control module 30. The first storage module 41 and the second storage module 42 are physically separated from each other.

The first computing array 10 is configured to execute a first type of neural network operation, the first computing array is a 3D MAC array, and the first type of neural network operation is a convolution operation.

The first storage module 41 is configured to store a weight required for the convolution operation.

The second storage module 42 is configured to store feature data required for the convolution operation.

The control module 30 is configured to read the weight required for the convolution operation from the first storage module 41 to the first computing array 10, and read the feature data required for the convolution operation from the second storage module 42 to the first computing array 10.

The first computing array 10 in the embodiment shown in FIG. 11 is the same as the first computing array 10 for executing the convolution operation in the above embodiments, and reference is made to the above for the detailed description, which will not be repeated redundantly here.

The control module 30 in the embodiment shown in FIG. 11 is the same as the control module 30 in the above embodiments, and reference is made to the above for the detailed description, which will not be repeated redundantly here.

The first storage module 41 and the second storage module 42 in the embodiment shown in FIG. 11 are the same as the first storage module 41 and the second storage module 42 in the above embodiments, respectively, and reference is made to the above for the detailed description, which will not be repeated redundantly here.

It should be understood that, in the device 200 for neural network processing provided in the embodiments of the present disclosure, by storing the feature data and the weight required for the convolution operation separately, the feature data and the weight required for the convolution operation can be read from two read ports, respectively, which could improve efficiency of data reading.

In the embodiment shown in FIG. 11, whether the device 200 includes the second computing array 20 in the above embodiments is not limited.

Optionally, in the embodiment shown in FIG. 11, the control module 30 is configured to read the weight and the feature data required for the convolution operation in parallel from the first storage module 41 and the second storage module 42 to the first computing array 10.

It should be understood that, by reading the feature data and the weight required for the convolution operation in parallel, data reading efficiency during the convolutional neural network processing can be improved, and thus the overall efficiency of the convolutional neural network processing can be improved.

Figure 12:
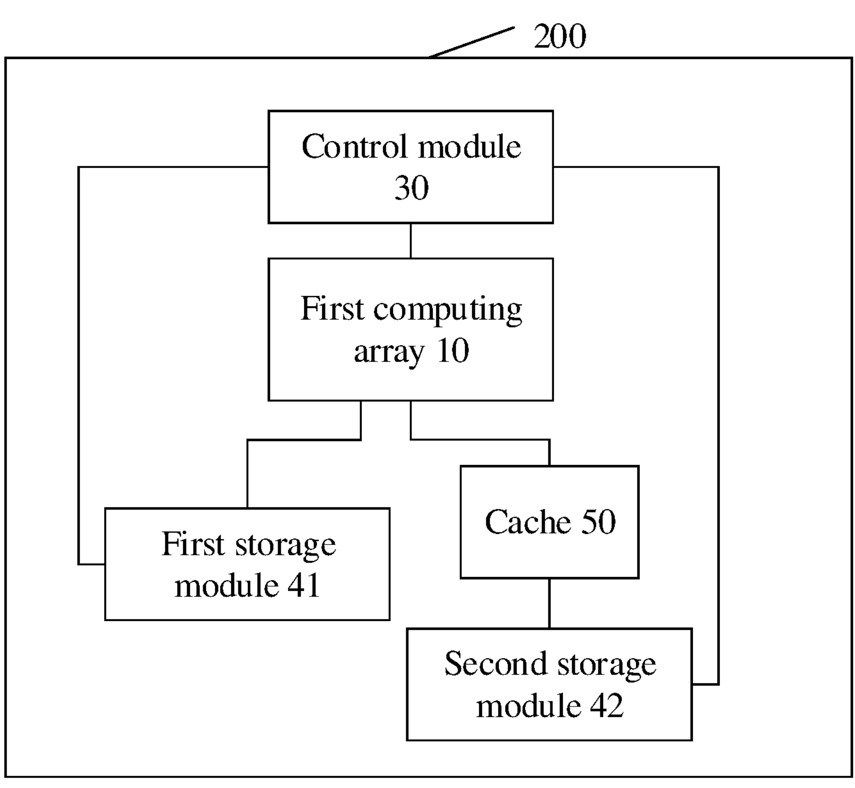
FIG. 12 is another schematic block diagram of a device for neural network processing provided in anther embodiment of the present disclosure.

Optionally, as shown in FIG. 12, in the embodiment shown in FIG. 10, the device 200 further includes a cache 50 configured to cache the feature data required for the convolution operation that is read from the second storage module 42. The control module 30 is configured to read the feature data required for the convolution operation from the cache 50 to the first computing array 10.

The cache 50 in the embodiment shown in FIG. 12 is the same as the cache 50 in the above embodiments, and reference is made to the above for the relevant description, which will not be repeated redundantly here.

In the embodiment shown in FIG. 12, the control module 30 is configured to: read feature data required for the convolution operation executed by the first computing array 10 from the second storage module 42 into the cache 50 in a case that the cache 50 does not include the feature data; or read feature data required for the convolution operation executed by the first computing array 10 directly from the second storage module 42 into the first computing array 10 in a case that the cache 50 already includes the feature data.

For example, the control module 30 may read the required feature data from the second storage module 42 into the cache 50 in advance, and read the feature data required for the convolution operation directly from the cache into the first computing array 10 during the execution of the convolution operation by the first computing array 10.

For another example, the control module 30 may read the required feature data from the second storage module 42 into the cache 50 in real time according to actual situations. Reference is made to the above relevant description for details, which will not be repeated redundantly here.

It should be understood that the access speed of the cache is fast, and thus, by using the cache to cache the feature data required for the convolution operation, the reading efficiency of the feature data required for the convolution operation can be improved, and the power consumption of data reading can be reduced.

Optionally, in the embodiment shown in FIG. 12, a distance between the cache 50 and the first computing array 10 is less than a distance between the second storage module 42 and the first computing array 10.

For example, in the embodiments shown in FIG. 11 and FIG. 12, the schematic diagram in which the first computing array 10 executes the convolution operation is shown in FIG. 7, and reference is made to the above for the relevant description, which will not be repeated redundantly here.

It should be understood that, according to this embodiment, the reading efficiency of the feature data required for the convolution operation can be further improved, and the power consumption of data reading can be reduced.

Optionally, the device 100 or 200 for neural network processing provided in the embodiments of the present disclosure may be a neural network specific chip. For example, the device 100 or 200 may be referred to as a TPU.

Figure 13:
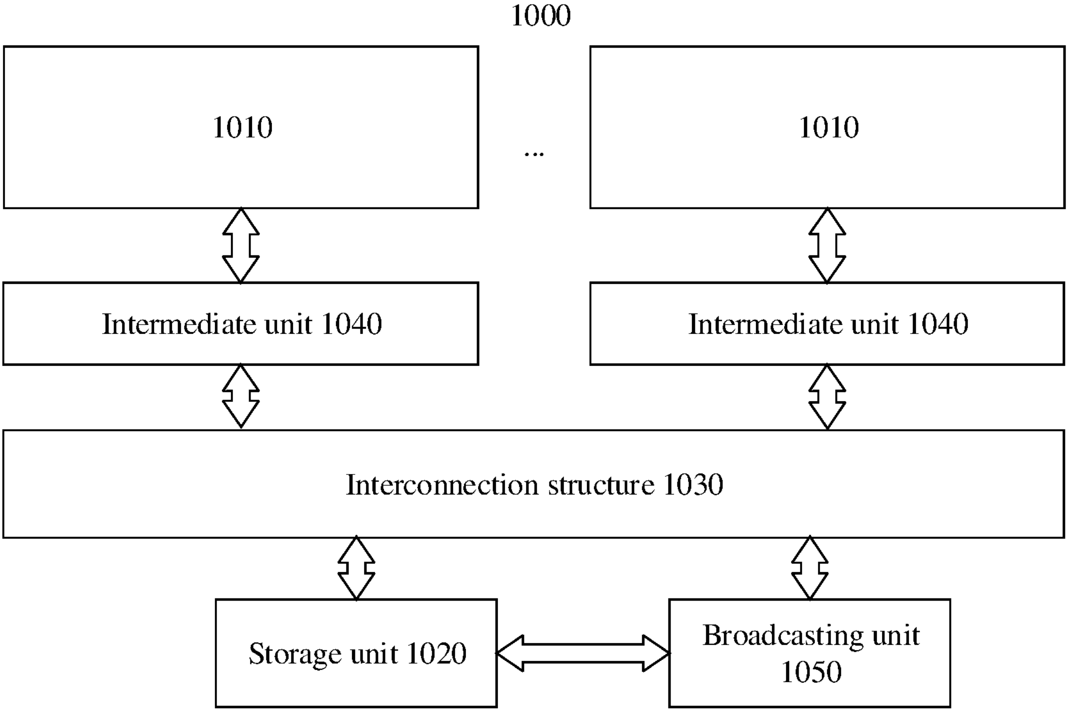
FIG. 13 is a schematic block diagram of a system for neural network processing provided in an embodiment of the present disclosure.

FIG. 13 is a schematic block diagram of a system 1000 for neural network processing provided in an embodiment of the present disclosure.

The system 1000 includes one or more processing units 1010. In FIG. 13, the description is made by an example that the system 1000 includes more processing units 1010.

Each processing unit 1010 is the device 100 or device 200 for neural network processing in the above embodiments.

As an example, a processing unit 1010 is the device 100 shown in FIG. 10, that is, the processing unit 1010 is constituted by a convolutional computing array region (Cube Top), a group block (Array Lane) and a control module.

In a case that the system 1000 includes more processing units 1010, the more processing units 1010 may include the device 100 and/or the device 200.

If the device 100 or the device 200 is denoted as a TPU kernel, the system 1000 for neural network processing provided in the embodiments of the present disclosure includes one or more TPU kernels.

Each processing unit 1010 in the system 1000 may execute an operation of one neural network (for example, a deep neural network). It should be understood that, when the system 1000 includes more processing units 1010, the system 1000 may execute operations of a plurality of neural networks.

In a case that the system 1000 includes more processing units 1010, the more processing units 1010 may run the same neural network simultaneously, or may run different neural networks.

The more processing units 1010 run the same neural network simultaneously, which indicates that the more processing units 1010 may execute operations of the same neural network simultaneously. The more processing units 1010 run different neural networks, which indicates that different processing units 1010 of the more processing units 1010 execute operations of different neural networks.

The system 1000 further includes a storage unit 1020 configured to store data required for neural network operations executed by the one or more processing units 1010.

For example, in a case that the system 1000 includes more processing units 1010, the more processing units 1010 share a bandwidth of the storage unit 1020.

For example, the storage unit 1020 includes one or more of a first storage and a second storage, where a read speed of the second storage is greater than a read speed of the first storage.

For example, the first storage is a memory, such as a double data rate (DDR) memory, and the second storage is a secondary storage (L2 Shared Mem). A read latency of the secondary storage is less than a read latency of the memory.

In other words, the storage unit 1020 is a DDR memory, or the storage unit 1020 includes a DDR memory and a secondary storage (L2 Shared Mem).

The system 1000 further includes a data portage unit configured to read out the data required for the neural network operations that is stored in the storage unit 1020 into the one or more processing units 1010, and the data portage unit includes an intermediate unit 1040 and/or a broadcasting unit 1050 described below.

Optionally, as shown in FIG. 13, the system 1000 further includes one or more intermediate units 1040 in one-to-one correspondence to the one or more processing units 1010. Each intermediate unit 1040 is configured to be responsible for data transport between a corresponding processing unit 1010 and the storage unit 1020. The transport here includes: reading out data in the storage unit 1020 to the processing unit 1010, or writing a processing result of the processing unit 1010 into the storage unit 1020.

Each processing unit 1010 may access data on the storage unit 1020 through a respective intermediate unit 1040.

Optionally, as shown in FIG. 13, the system 1000 further includes a broadcasting unit 1050 configured to broadcast data shared by the more processing units 1010 that is stored in the storage unit 1020 into the more processing units 1010.

For example, in a case that the more processing units 1010 are configured to run the same convolutional neural network simultaneously, the broadcasting unit 1050 may read out a weight stored in the storage unit 1020 and broadcast it to the more processing units 1010. For example, in an example of the processing unit 1010 as the device shown in FIG. 7, the broadcasting unit 1050 may read out the weight in the storage unit 1020 and broadcast it into the first storage modules 41 (L1 weight Mem) of the more processing units 1010.

For another example, an intermediate unit 1040 corresponding to each processing unit 1010 may be referred to as a GDMAx, and the broadcasting unit 1050 is referred to as a Broadcast GDMA.

The system 1000 further includes an interconnection structure 1030 configured for data or command transmission between the processing units 1020 and the storage unit 1020.

The interconnection structure 1030 may be a bus interconnection structure for command and data distribution.

Alternatively, the interconnection structure 1030 may also be an interconnection structure in another form for command and data distribution.

For example, the data or command transmission among the more processing units 1010, the storage unit 1020 and the broadcasting unit 1050 may be performed through a bus interconnection structure, or an interconnection structure in another form.

The interconnect structure 1030 may be referred to as a Fabric.

It should be understood that, in a case that the system 1000 includes more processing units 1010, the system 1000 provided in the embodiments of the present disclosure can support a plurality of neural networks, and has good generality.

It should be understood that the system 1000 provided in the embodiments of the present disclosure can support a plurality of neural networks, and has good generality. In addition, the system 1000 can execute operations of the plurality of neural networks in parallel, which can improve the computational efficiency of the neural networks.

The system 1000 may be referred to as a neural network specific chip architecture.

If the device 100 or 200 provided in the embodiments of the present disclosure is referred to as a TPU, the processing unit 1010 included in the system 1000 may be referred to as a TPU kernel. The TPU kernel in the system 1000 is scalable.

It should be understood that, when the system 1000 includes a plurality of TPU kernels, the computing power of the entire neural network processing chip can be improved.

The plurality of TPU kernels included in the system 1000 provided in the embodiments of the present disclosure may run different neural networks, or may run the same neural networks simultaneously. Such flexible configuration can improve not only a utilization ratio of each TPU kernel, but also the overall computational capability of the system 1000.

Based on the above description, according to the device and system for neural network processing provided in the embodiments of the present disclosure, the computational speed of the neural network can be increased, and the computational power consumption can be reduced.

The device embodiments are described above, and the method embodiments will be described below. It should be understood that the description of the method embodiments corresponds to the description of the device embodiments. Therefore, for the content that is not described in detail, reference may be made to the above device embodiments, which will not be repeated redundantly here for brevity.

As shown in FIG. 14, an embodiment of the present disclosure provides a method for neural network processing, the method is applied to the device 100 for neural network processing provided in the above embodiments, the device 100 includes a first computing array and a second computing array, and the method includes the following steps.

S1410, a first type of neural network operation is executed by the first computing array.

S1420, a second type of neural network operation is executed by the second computing array, and the second type of neural network operation is different from the first type of neural network operation.

For example, the method in the embodiment shown in FIG. 14 may be executed by the device 100 for neural network processing in the above embodiments, for example, by the control module 30 in the device 100.

In the embodiment shown in FIG. 14, the first computing array is the same as the first computing array 10 in the device 100 in the above embodiments, the second computing array is the same as the second computing array 20 in the device 100 in the above embodiments, the first type of neural network operation is the same as the first type of neural network operation in the above embodiments, the second type of neural network operation is the same as the second type of neural network operation in the above embodiments, and reference is made to the above description for the relevant contents, which will not be repeated redundantly here.

Optionally, in the embodiment shown in FIG. 14, the second type of neural network operation and the first type of neural network operation are executed in parallel.

Optionally, in the embodiment shown in FIG. 14, the method further includes: reading, from a first storage module, a weight required for a convolution operation into the first computing array, and reading, from a second storage module, feature data required for the convolution operation into the first computing array, the second storage module being disposed separately from the first storage module.

Optionally, in the embodiment shown in FIG. 14, the method further includes: reading, from the second storage module, data required for the second type of neural network operation into the second computing array.

Optionally, in the embodiment shown in FIG. 14, the reading, from the first storage module, the weight required for the convolution operation into the first computing array, and reading, from the second storage module, the feature data required for the convolution operation into the first computing array, includes: reading, from the first storage module and the second storage module, the weight and the feature data required for the convolution operation in parallel into the first computing array.

Optionally, in the embodiment shown in FIG. 14, the reading, from the second storage module, the feature data required for the convolution operation into the first computing array, includes: reading, from a cache, the feature data required for the convolution operation into the first computing array, the cache being configured to cache the feature data required for the convolution operation that is stored in the second storage module.

Optionally, in the embodiment shown in FIG. 14, the reading, from the cache, the feature data required for the convolution operation into the first computing array, includes: determining whether the cache has the feature data required for the convolution operation executed by the first computing array; and if a determination result is yes, reading, from the cache, the feature data required for the convolution operation into the first computing array; or if a determination result is no, reading, from the second storage module, required feature data into the cache, and reading, from the cache, the feature data required for the convolution operation into the first computing array.

Optionally, in the embodiment shown in FIG. 14, a distance between the cache and the first computing array is less than a distance between the second storage module and the first computing array.

In the embodiment shown in FIG. 14, the first storage module is the same as the first storage module 41 in the device 100 in the above embodiments, the second storage module is the same as the second storage module 42 in the device 100 in the above embodiments, the cache is the same as the cache 50 in the device 100 in the above embodiments, and reference is made to the above description for the relevant contents, which will not be repeated redundantly here.

Optionally, in the embodiment shown in FIG. 14, the method further includes: reading, from a third storage module, data required for the first type neural network operation into the first computing array, and reading, from a fourth storage module, data required for the second type neural network operation into the second computing array, the fourth storage module being disposed separately from the third storage module.

Optionally, in the embodiment shown in FIG. 14, a distance between the third storage module and the first computing array is less than a distance between the fourth storage module and the first computing array; and/or a distance between the fourth storage module and the second computing array is less than a distance between the third storage module and the second computing array.

In the embodiment shown in FIG. 14, the third storage module is the same as the third storage module 43 in the device 100 in the above embodiments, the fourth storage module is the same as the fourth storage module 44 in the device 100 in the above embodiments, and reference is made to the above description for the relevant contents, which will not be repeated redundantly here.

Optionally, in the embodiment shown in FIG. 14, step S1420 includes: executing, by a plurality of second computing arrays, the second type of neural network operations, that is, executing, by the plurality of second computing arrays, a same type of operations in the neural network.

As shown in FIG. 15, another embodiment of the present disclosure provides a method for neural network processing, and the method includes the following steps.

S1510, a weight required for a convolution operation is read from a first storage module into a first computing array, feature data required for the convolution operation is read from a second storage module into the first computing array, and the second storage module is disposed separately from the first storage module.

S1520, the convolution operation is executed on the feature data and the weight by the first computing array.

The method may be executed by the device 200 for neural network processing in the above embodiments, for example, by the control module 30 in the device 200.

In the embodiment shown in FIG. 15, the first computing array is the same as the first computing array 10 in the device 200 in the above embodiments, the first storage module is the same as the first storage module 41 in the device 200 in the above embodiments, the second storage module is the same as the second storage module 42 in the device 200 in the above embodiments, and reference is made to the above description for the relevant contents, which will not be repeated redundantly here.

Optionally, in the embodiment shown in FIG. 15, step S1510 includes: reading, from the first storage module and the second storage module, the weight and the feature data required for the convolution operation in parallel into the first computing array.

Optionally, in the embodiment shown in FIG. 15, step S1510 includes: reading, from a cache, the feature data required for the convolution operation into the first computing array, the cache being configured to cache the feature data required for the convolution operation that is stored in the second storage module.

Optionally, in the embodiment shown in FIG. 15, step S1510 includes: determining whether the cache has the feature data required for the convolution operation executed by the first computing array; and if a determination result is yes, reading, from the cache, the feature data required for the convolution operation into the first computing array; or if a determination result is no, reading, from the second storage module, required feature data into the cache, and reading, from the cache, the feature data required for the convolution operation into the first computing array.

Optionally, in the embodiment shown in FIG. 15, a distance between the cache and the first computing array is less than a distance between the second storage module and the first computing array.

In the embodiment shown in FIG. 15, the cache is the same as the cache 50 in the device 200 in the above embodiments, and reference is made to the above description for the relevant contents, which will not be repeated redundantly here.

FIG. 16 is a method for neural network processing provided in still another embodiment of the present disclosure, and the method includes the following steps.

S1610, data required for neural network operations is read from a storage unit to one or more processing units, and a processing unit is the device 100 or 200 for neural network processing in the above embodiments.

S1620, The neural network operations are executed by the one or more processing units, respectively.

For example, the method in the embodiment shown in FIG. 16 may be executed by the intermediate unit 1040 or the broadcasting unit 1050 in the system 1000 in the above embodiments.

Optionally, in the embodiment shown in FIG. 16, step S1610 includes: executing, by the more processing units, a plurality of neural network operations in parallel.

Optionally, in the embodiment shown in FIG. 16, in a case that the more processing units are configured to execute operations of a same neural network, step S1610 includes: broadcasting data shared by the more processing units that is stored in the storage unit into the more processing units.

Optionally, in the embodiment shown in FIG. 16, different processing units of the more processing units are configured to execute operations of different neural networks.

As examples but not limitations, two example are given below with reference to FIG. 7 and FIG. 9, respectively.

With reference to FIG. 7, components involved in the convolution operation include the following.

1) The second control unit 32 (Control Logic) is responsible for instruction parsing, control of computation flows and transmission of operands. The second control unit 32 is located outside the convolution accelerate unit (Cube Top).

For example, for a convolution instruction, the second control unit 32 is mainly responsible for reading out an input feature map (IFMAP) from the second storage module 42 (L1 Data Mem) to the first computing array 10 (Cube) for the convolution computation, and caching a final computation result of the first computing array 10 into the second storage module 42.

2) The second storage module 42 (L1 Data Mem) is mainly configured to store data required during the instruction computation and a computation result. The second storage module 42 is located outside the Cube Top.

For example, for a convolution instruction, what is stored in the L1 Data Mem is an input feature map (IFMAP) and an output feature map (DFMAP) obtained after computation by the first computing array 10.

3) The first control unit 31 (which may also be referred as a control unit of the Cube (Cube Control Logic)) is mainly responsible for control of convolutional computation flows and transport of a weight (or referred to as data of a convolution kernel) required during convolution. The first control unit 31 is located in the Cube Top.

For example, there may be some handshake signals between the second control unit 32 located outside the Cube Top and the first control unit 31 located in the Cube Top to complete the transmission of the input feature map (IFMAP) and the weight in cooperation.

4) The first storage module 41 (L1 Weight Mem) is configured to store a weight (or referred to as data of a convolution kernel) required for a convolution instruction. The first storage module 41 is located in the Cube Top.

5) The cache 50 (IFMAP Cache) is configured to cache an IFMAP read out from the L1 Data Mem. The cache 50 is located in the Cube Top.

6) The first computing array 10 (Cube) is configured to execute a convolution operation.

The first computing array 10 is a 3D MAC array. Three dimensions of the 3D MAC array represent the number of computable channels of an IFMAP, the number of channels of an OFMAP and the number of HWs of the OFMAP, respectively.

If the maximum values of these three dimensions are denoted as IC, OC and OHW, respectively, the number of MACs included in the first computing array 10 is IC*OC*OHW. Reference may be made to different application scenarios of the chip for the specific settings of these three parameters, so that the first computing array 10 has a higher utilization ratio.

Since the second storage module 42 is far away from the first computing array 10, the first computing array 10 takes long time to read the IFMAP, resulting in high power consumption.

Since the IFMAP data in the convolution computation has good locality, the IFMAP data may be cached through the IFMAP Cache with the locality of the IFMAP data, so as to reduce the times of reading by the first computing array 10 to the second storage module 42, and thereby reducing the time and power consumption during the convolution computation.

As an example, the process of executing a convolution operation using the convolution accelerate unit shown in FIG. 7 is provided as follows.

First, the first control unit 31 reads a weight required for a convolution operation from the first storage module 41 into the first computing array 10.

Then, before sending a read command to the second storage module 42, the second control unit 32 determines whether the data to be read is already in the cache 50 first. If so, the data is directly read out from the cache 50 to the first computing array 10; or if not, the read command is sent to the second storage module 42, so that the IFMAP is read out from the second storage module 42 into the cache 50 and the first computing array 10.

Optionally, the operation of reading the weight required for the convolution operation by the first control unit 31 and the operation of reading the feature data required for the convolution operation by the second control unit 32 may be executed simultaneously.

After the convolution operation of the first computing array 10 is completed, the second control unit 32 stores an OFMAP obtained by the first computing array 10 into the second storage module 42.

As shown in FIG. 9, the structure for executing a vector operation may be constituted by a series of vector computing unit (Vector unit) arrays (such as the second computing arrays 20 shown in FIG. 9).

As shown in FIG. 9, a block (Lane) contains a group of a second computing array 20 and a storage unit (which may be denoted as a L1 Data Mem, Mem for short in FIG. 9), a group (Array) contains several blocks (Lanes), and several groups (Arrays) constitute a larger array, which may be referred to a block group (lane array).

With reference to FIG. 9, components involved in the vector operation include the following.

1) The second control unit 32 (Control Logic) is configured to be responsible for instruction parsing, control of computation flows and transmission of operands. The second control unit 32 is located outside the block group (lane array).

2) The array interconnection structure 60 (Array Fabx) is configured to be responsible for command and data transfer between the groups (Arrays) and within the groups (Arrays). The array interconnection structure 60 is located in the block group (lane array).

3) The second computing array 20 (vector computing unit array) is configured to execute a vector operation.

4) The storage unit (Mem) is mainly configured to store data required during the instruction computation and a computation result. The storage unit (Mem) is located in the block group (lane array).

The storage units (Mems) shown in FIG. 9 are logically a storage module: the second storage module 42.

A storage unit (Mem) in each block (lane) may be uniformly addressed.

For example, for a convolution instruction, data of the corresponding address needs to be collected from the block group (lane array) into the first computing array 10.

For another example, for a pooling instruction, data of the corresponding address needs to be collected from the block group (lane array) into the second computing array 20.

As an example, the process of executing a pooling operation using the structure for executing the vector operation shown in FIG. 9 is provided as follows.

First, the second control unit 32 parses an instruction to obtain an identifier (ID) of a block (lane) to be involved in the computation as IDx, and sends instructions for reading an input feature map (IFMAP) and a pooling box (Kernel) to a Mem of the block (lane) identified as IDx through two read channels r0 and r1. Channel r0 is responsible for reading of the IFMAP, and r1 is responsible for reading of the pooling box (Kernel).

After the second control unit 32 reads out the IFMAP and the Kernel from the Mem into a second computing array 20 of the block (lane) identified as IDx for the pooling operation.

After the second computing array 20 of the block (lane) identified as IDx completes the pooling operation, the second control unit 32 sends a write command through a write port to write a computation result of the pooling operation into the Mem of the block (lane) identified as IDx.

The terms used in the present application are merely used to describe the embodiments and are not intended to limit the claims. As used in the description of the embodiments and the claims, the singular forms “a”, “an” and “the” are intended to include the plural forms as well, unless the context clearly indicates otherwise. Similarly, the term “and/or” used in the present application indicates and includes any or all possible combinations of one or more associated listed items. In addition, the terms “comprise” and its variations “comprises” and/or “comprising”, when used in the present application, specify the presence of stated features, integers, steps, operations, elements, and/or components, but do not preclude the presence or addition of one or more other features, integers, steps, operations, elements, components, and/or groups thereof.

The various aspects, embodiments, implementations or features in the described embodiments can be used separately or in any combination. Various aspects in the described embodiments may be implemented by software, hardware, or a combination of software and hardware. The described embodiments may also be embodied by a computer-readable medium having stored thereon computer-readable code including instructions executable by at least one computing apparatus. The computer-readable medium may be associated with any data storage apparatus that can store data which can be read by a computer system. Examples of the computer readable medium may include a read-only memory, a random-access memory, CD-ROMs, HDDs, DVDs, magnetic tape, and optical data storage apparatuses. The computer-readable medium can also be distributed in network-coupled computer systems so that the computer-readable code is stored and executed in a distributed fashion.

The foregoing technical description may be made with reference to the accompanying drawings, which form a part of the present application, and in which, by way of description, implementations in accordance with the described embodiments are shown. Although these embodiments are described in sufficient detail to enable one skilled in the art to implement these embodiments, these embodiments are not limiting; such that other embodiments may be used, and changes may be made without departing from the scope of the described embodiments. For example, the order of operations described in the flowcharts is not limiting, and thus the order of two or more operations illustrated in the flowcharts and described in accordance with the flowcharts may vary according to several embodiments. As another example, in several embodiments, one or more operations illustrated in the flowcharts and described in accordance with the flowcharts are optional, or may be deleted. Additionally, certain steps or functionality may be added to the disclosed embodiments, or the order of two or more steps permuted. All such changes are considered to be included in the disclosed embodiments and claims.

Additionally, the terms used in the above technical description are used to provide a thorough understanding of the described embodiments. However, excessive details are not required to implement the described embodiments. Thus, the foregoing description of the embodiments are presented for purposes of illustration and description. The embodiments presented in the foregoing description and the examples disclosed in accordance with these embodiments, are provided separately to add context and to facilitate understanding of the described embodiments. The above description is not intended to be exhaustive or to limit the described embodiments to the precise form of the disclosure. Several modifications, options, and variations are possible in light of the above teachings. In some instances, well known process steps have not been described in detail in order to avoid unnecessarily affecting the described embodiments.

What is claimed is:

1. A method for neural network processing, wherein the method is applied to a device for neural network processing, the device comprises a first computing array, a second computing array, and a control module, the control module includes a first control unit and a second control unit, the second control unit is configured to be in communication with the first control unit, a module or region where the first computing array and a first storage module are located is denoted as a convolution accelerate unit, and a second storage module is located outside the convolution accelerate unit;

the method comprises:

executing, by the first computing array, a first type of neural network operation, wherein the first computing array is a three-dimensional multiply accumulate (3D MAC) array, and the first type of neural network operation is a convolution operation;

executing, by the second computing array, a second type of neural network operation, the second type of neural network operation being different from the first type of neural network operation;

reading, from the first storage module, a weight required for the convolution operation into the first computing array by the first control unit; and reading, from the second storage module, feature data required for the convolution operation into the first computing array by the second control unit, the second storage module being disposed separately from the first storage module;

reading, from the second storage module, data required for the second type of neural network operation into the second computing array by the second control unit;

wherein the reading, from the second storage module, the feature data required for the convolution operation into the first computing array by the second control unit, comprises:

reading, from a cache, the feature data required for the convolution operation into the first computing array by the second control unit when the first computing array is to execute the convolution operation, the cache being configured to cache the feature data required for the convolution operation that is read from the second storage module;

wherein the reading, from the cache, the feature data required for the convolution operation into the first computing array by the second control unit when the first computing array is to execute the convolution operation, comprises:

determining, by the second control unit, whether the cache has the feature data required for the convolution operation executed by the first computing array when the first computing array is to execute the convolution operation; and if a determination result is yes, reading, from the cache, the feature data required for the convolution operation into the first computing array by the second control unit; or if a determination result is no, reading, from the second storage module, required feature data into the cache, and reading, from the cache, the feature data required for the convolution operation into the first computing array by the second control unit;

wherein the operation of reading the weight required for the convolution operation by the first control unit and the operation of reading the feature data required for the convolution operation by the second control unit are executed simultaneously, and after the convolution operation of the first computing array is completed, the second control unit stores a computation result obtained by the first computing array into the second storage module.

2. The method according to claim 1, wherein the second type of neural network operation and the first type of neural network operation are executed in parallel.

3. The method according to claim 1, wherein the reading, from the first storage module, the weight required for the convolution operation into the first computing array, and reading, from the second storage module, the feature data required for the convolution operation into the first computing array, comprises:

reading, from the first storage module and the second storage module, the weight and the feature data required for the convolution operation in parallel into the first computing array.

4. The method according to claim 1, wherein a distance between the cache and the first computing array is less than a distance between the second storage module and the first computing array.

5. The method according to claim 1, wherein the method further comprises:

reading, from a third storage module, data required for the first type neural network operation into the first computing array, and reading, from a fourth storage module, data required for the second type neural network operation into the second computing array, the fourth storage module being disposed separately from the third storage module.

6. The method according to claim 5, wherein a distance between the third storage module and the first computing array is less than a distance between the fourth storage module and the first computing array; and/or a distance between the fourth storage module and the second computing array is less than a distance between the third storage module and the second computing array.

7. The method according to claim 1, wherein the method further comprises:

reading, from a storage unit, data required for neural network operations to one or more processing units, wherein each processing unit comprises the first computing array to execute the first type of neural network operation, and the second computing array to execute the second type of neural network operation; and executing, by the one or more processing units, the neural network operations, respectively.

8. The method according to claim 7, wherein the executing, by the one or more processing units, the neural network operations, respectively, comprises:

executing, by the more processing units, a plurality of neural network operations in parallel.

9. The method according to claim 7, wherein in a case that the more processing units are configured to execute operations of a same neural network, the reading, from the storage unit, the data required for the neural network operation to the one or more processing units, comprises:

broadcasting data shared by the more processing units that is stored in the storage unit into the more processing units.

10. The method according to claim 7, wherein different processing units of the more processing units are configured to execute operations of different neural networks.

* * * * *